(12) United States Patent
Coleman

(10) Patent No.: US 11,853,756 B2
(45) Date of Patent: Dec. 26, 2023

(54) CALCULATION ENGINE FOR PERFORMING CALCULATIONS BASED ON DEPENDENCIES IN A SELF-DESCRIBING DATA SYSTEM

(71) Applicant: ARAS CORPORATION, Andover, MA (US)

(72) Inventor: Sean Coleman, Walpole, MA (US)

(73) Assignee: Aras Corporation, Andover, MA (US)

( * ) Notice: Subject to any disclaimer, the term of this patent is extended or adjusted under 35 U.S.C. 154(b) by 0 days.

(21) Appl. No.: 17/825,816

(22) Filed: May 26, 2022

(65) Prior Publication Data

US 2022/0291924 A1     Sep. 15, 2022

Related U.S. Application Data

(63) Continuation of application No. 17/526,511, filed on Nov. 15, 2021, now Pat. No. 11,614,935, which is a
(Continued)

(51) Int. Cl.
| | |
|---|---|
| *G06F 9/30* | (2018.01) |
| *G06F 9/38* | (2018.01) |
| *G06F 16/22* | (2019.01) |
| *G06F 9/54* | (2006.01) |
| *G06F 16/2455* | (2019.01) |

(52) U.S. Cl.
CPC ........ *G06F 9/30029* (2013.01); *G06F 9/3001* (2013.01); *G06F 9/30021* (2013.01); *G06F 9/30087* (2013.01); *G06F 9/3838* (2013.01); *G06F 9/542* (2013.01); *G06F 16/22* (2019.01); *G06F 16/2282* (2019.01); *G06F 16/24564* (2019.01); *G06F 16/24566* (2019.01)

(58) Field of Classification Search
None
See application file for complete search history.

(56) References Cited

U.S. PATENT DOCUMENTS

| | | |
|---|---|---|
| 6,571,215 B1 | 5/2003 | Mahapatro |
| 7,519,948 B1 | 4/2009 | Cornish |
| | (Continued) | |

OTHER PUBLICATIONS

Dailey et al., "A Self-Describing Data Transfer Model for ITS Applications", IEEE Transactions on Intelligence Transportation Systems, vol. 3, No. 4, Dec. 2002, pp. 293-300.

*Primary Examiner* — Eric Coleman
(74) *Attorney, Agent, or Firm* — Dickinson Wright PLLC; Stephen A. Mason; Jonathan H. Harder

(57) ABSTRACT

A method includes receiving a request to modify a first value of a first field of a first item in a self-describing data system, and obtaining a domain comprising items in the self-describing data system. The first item and a second item are included in items, and the second item comprises a second field having a second value. The method includes calculating, based on a rule of the second field, a dependency of the second value on the first value. The rule specifies how the second value is to be calculated using the first value. The method includes modifying, based on the request, the first value. The method includes receiving an event triggered by the modification to the first value. The method includes, responsive to the event, calculating the second value based on the rule, and storing the second value in the second field.

20 Claims, 23 Drawing Sheets

Related U.S. Application Data continuation of application No. 16/913,537, filed on Jun. 26, 2020, now Pat. No. 11,175,914.

(60) Provisional application No. 62/868,475, filed on Jun. 28, 2019.

(56) References Cited

U.S. PATENT DOCUMENTS

| | | | |
|---|---|---|---|
| 7,559,048 B1 | 7/2009 | Bedell et al. | |
| 7,765,520 B2 | 7/2010 | Wagner et al. | |
| 8,578,389 B1 * | 11/2013 | Boucher | G06F 9/4494 717/148 |
| 8,699,350 B1 * | 4/2014 | Kumar | H04L 45/18 370/252 |
| 8,996,492 B2 | 3/2015 | Paradies et al. | |
| 10,721,315 B1 * | 7/2020 | Ezra | H04L 67/02 |
| 11,296,972 B2 * | 4/2022 | Bisht | H04L 43/062 |
| 2004/0054565 A1 | 3/2004 | Nemecek et al. | |
| 2005/0073958 A1 * | 4/2005 | Atlas | H04L 45/22 370/238 |
| 2005/0216111 A1 | 9/2005 | Ooshima et al. | |
| 2005/0278208 A1 | 12/2005 | Schultz | |
| 2006/0031078 A1 | 2/2006 | Pizzinger et al. | |
| 2006/0136277 A1 | 6/2006 | Perry | |
| 2006/0200372 A1 | 9/2006 | O'Cull et al. | |
| 2006/0294150 A1 * | 12/2006 | Stanfill | G06F 8/51 |
| 2010/0017246 A1 | 1/2010 | Farrell et al. | |
| 2013/0127891 A1 * | 5/2013 | Kim | G06T 11/001 345/582 |
| 2015/0006232 A1 | 1/2015 | Anaby-Tavor et al. | |
| 2016/0253773 A1 * | 9/2016 | Suzuki | G06F 9/3879 345/505 |
| 2017/0004431 A1 | 1/2017 | De et al. | |
| 2017/0147709 A1 | 5/2017 | Ganz | |
| 2018/0365614 A1 * | 12/2018 | Palmer | G06Q 10/103 |
| 2019/0116116 A1 * | 4/2019 | Przygienda | H04L 41/12 |
| 2019/0364483 A1 * | 11/2019 | Gokturk | H04L 45/125 |

\* cited by examiner

FIG. 1

<Item type = "Part" id="ABCDEF012345" action="get"/>
      105                 110              115

```
<Item type="Part" action="add">
    <item_number>999-888</item_number>
    <description>Some Assy</description>
    <Relationships>
      <Item type="Part BOM" action="add">
        <quantity>10</quantity>
        <related_id>
            <Item type="Part" action="add">
              <item_number>123-456</item_number>
              <description>1/4w 10% 10K Resistor</description>
            </Item>
        </related_id>
      </Item>
    </Relationships>
</Item>
```

FIG. 7A

```
<?xml version="1.0"?>                                           ⌐700
<AML>
  <Item action="qry_ExecuteQueryDefinition" type="qry_QueryDefinition">
    <root_query_item_ref_id>part_1</root_query_item_ref_id>
    <name>UseCase_1</name>
705 <Relationships>
      <Item type="qry_QueryCondition">
        <condition_xml>
710a      <![CDATA[<condition> <eq> <property ref-id="TopPart_id_GUID"/> <property ref-
            id="PBom_sourceId_GUID"/> </eq> </condition> ]]>
        </condition_xml>
        <ref_id>join_cond_1</ref_id>
      </Item>
      <Item type="qry_QueryCondition">
        <condition_xml>
710b      <![CDATA[<condition> <eq> <property ref-id="PBom_relatedId_GUID"/> <property ref-
            id="RelPart_id_GUID"/> </eq> <condition> ]]>
        </condition_xml>
        <ref_id>join_cond_2</ref_id>
      </Item>
      <Item type="qry_QueryCondition">
        <condition_xml>
710c      <![CDATA[<condition> <gt> <property ref-id="PBom_quantity_GUID"/>
            <constant>5</constant> </gt> </condition> ]]>
        </condition_xml>
        <ref_id>cond_1</ref_id>
      </Item>
      <Item type="qry_QueryItem">
        <alias>TopPart</alias>
        <condition_ref_id/>
715a    <item_type type="ItemType" name="Part"
          keyed_name="Part">4F1AC04A2B484F3ABA4E20DB63808A88</item_type>
        <ref_id>part_1</ref_id>
        <Relationships>
          <Item type="qry_QueryItemSelectProperty">
720a        <property_ref_id>TopPart_id_GUID</property_ref_id>
          </Item>
          <Item type="qry_QueryItemSelectProprty">
720b        <property_ref_id>TopPart_itemNumber_GUID</property_ref_id>
          </Item>
          <Item type="qry_QueryItemSelectProperty">
720c        property_ref_id>TopPart_createdById_GUID</property_ref_id>
          </Item>
          <Item type="qry_QueryItemSortProperty">
725         <property_ref_id>TopPart_name_GUID</property_ref_id>
            <sort_order>128</sort_order>
            <sort_order_direction>Ascending</sort_order_direction>
          </Item>
        <Relationships>
```

FIG. 7B

```
                                                                    700
                </Item>
                <Item type="qry_QueryItem">
                    <alias>PBom</alias>
                    <condition_ref_id>cond_1</condition_ref_id>
715b            <item_type type="ItemType" name="Part BOM" keyed_name="Part
                    BOM">5E9C5A12CC58413A8670CF4003C57848</item_type>
                <ref_id>part_bom_1</ref_id>
              + <Relationships>
                </Item>
                <Item type="qry_QueryItem">
                    <alias>RelPart</alias>
                    <condition_ref_id/>
715c            <item_type type="ItemType" name="Part"
                    keyed_name="Part">4F1AC04A2B484F3ABA4E20DB63808A88</item_type>
                <ref_id>part_2</ref_id>
              - <Relationships>
                    - <Item type="qry_QueryItemSelectProperty">
                          <property_ref_id>RelPart_ItemNumber_GUID</property_ref_id>
720d                  </Item>
                    </Relationships>
                </Item>
                <Item type="qry_QueryReferency">
                    <child_ref_id>part_bom_1</child_ref_id>
                    <condition_ref_id>join_cond_1</condition_ref_id>
730a            <parent_ref_id>part_1</parent_ref_id>
                <ref_id>qref_1</ref_id>
                </Item>
                <Item type="qry_QueryReferency">
                    <child_ref_id>part_2</child_ref_id>
                    <condition_ref_id>join_cond_2</condition_ref_id>
730b            <parent_ref_id>part_1</parent_ref_id>
                <ref_id>qref_2</ref_id>
                </Item>
            <Relationships>
        </Item>
    <AML>
```

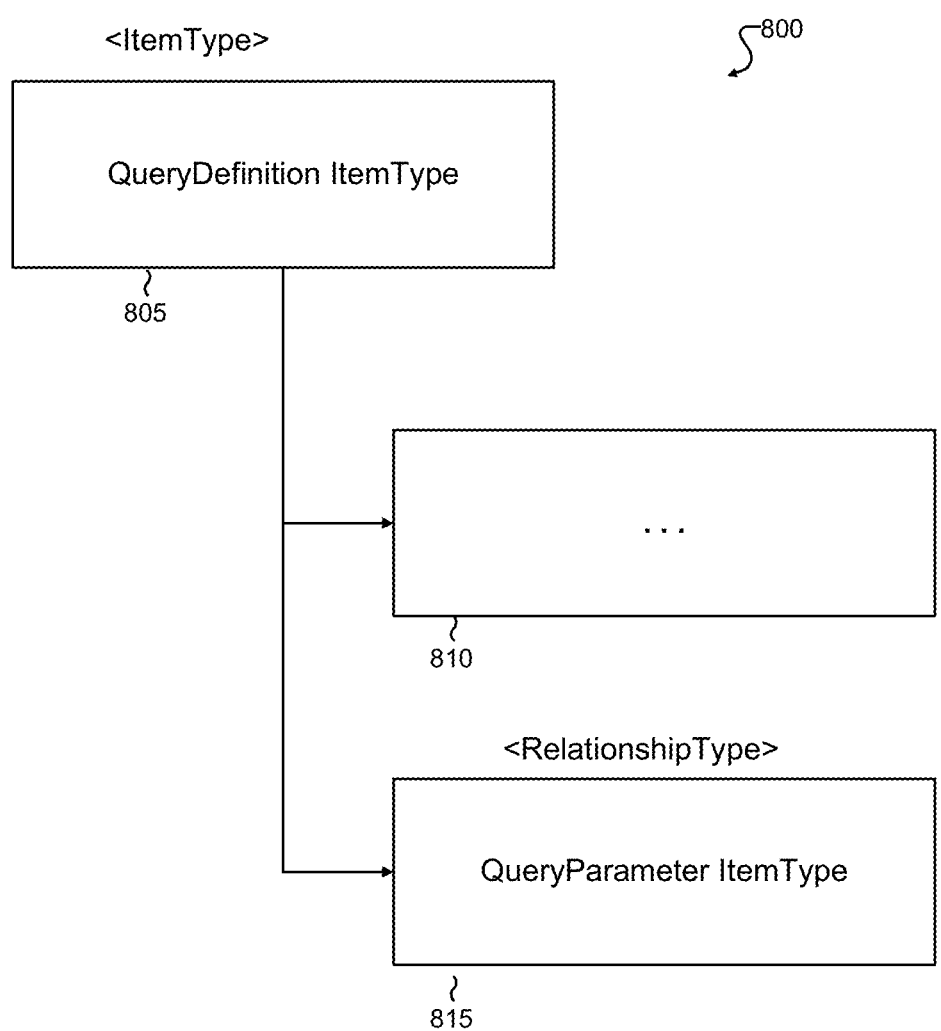

FIG. 9

```
<Item type="qry_QueryDefinition" action="qry_ExecuteSimplifiedQueryDefinition">
  <Parameters>
    <parameter name="@PartNumber" type="string" value="IN-00001" />      } 905
  </Parameters>
  <Relationships>                                                        907
    <Item type="Part" qb:alias="Part" qb:select="id, item_number">
      <qb:filter>
        <eq>
          <property qb:alias="Part.item_number" />
          <parameter name="@PartNumber" />
        </eq>
      </qb:filter>                                                        910
    </Item>
  </Relationships>
</Item>
```

FIG. 10

```
                                                                    ┌─1000
<Item type="qry_QueryDefinition"
 action="qry_ExecuteSimplifiedQueryDefinition">
  <Parameters>
1005  <parameter name="@Levels" type="integer" value="2" />
  </Parameters>
  <Relationships>
    <Item type="Part" qb:alias="Part" qb:select="id, item_number">
      <Relationships>
        <Item type="Part BOM" qb:alias="Part BOM" qb:select="id">
          <qb:fetch>
            <if>
              <condition>
                <match-path>
                  <parameter name="@ExecutionPath" />
                  <format-string format="QR1/(QR2/QR1){#0}/">
                    <argument-value key="#0">
1010                  <parameter name="@Levels" />
                    </argument-value>
                  </format-string>
                </match-path>
              </condition>
              <then>0</then>
            </if>
          </qb:fetch>
        </Item>
      </Relationships>
    </Item>
  </Relationships>
</Item>
```

```xml
<AML>
<Item alias="Part">
    <id>ROOT_PART_ID</id>
    <Relationships>
        <Item alias="Part BOM">
            <id>PB_1</id>
            <Relationships>
                <Item alias="Part">
                    <id>REUSED_PART_ID</id>
                </Item>
            </Relationships>
        </Item>
        <Item alias="Part BOM">
            <id>PB_2</id>
            <Relationships>
                <Item alias="Part">
                    <id>REUSED_PART_ID</id>
                </Item>
            </Relationships>
        </Item>
        <Item alias="Part BOM">
            <id>PB_3</id>
            <Relationships>
                <Item alias="Part">
                    <id>NON_REUSED_PART_ID</id>
                    <Relationships>
                        <Item alias="Part BOM">
                            <id>PB_4</id>
                            <Relationships>
                                <Item alias="Part">
                                    <id>REUSED_PART_ID</id>
                                    <Relationships>
                                        <Item alias="Part Document">
                                            <id>PD_1</id>
                                        </Item>
                                    </Relationships>
                                </Item>
                            </Relationships>
                        </Item>
                    </Relationships>
                </Item>
            </Relationships>
        </Item>
    </Relationships>
</Item>
</AML>
```

1405 (brace indicating the inner nested block from `<Item alias="Part BOM"><id>PB_3</id>` through its closing `</Item>`)

```xml
<Result>
    <Item alias="Part">
        <id>ROOT_PART_ID</id>
        <QB_flat_id>0</QB_flat_id>
        <QB_flat_parent_ids></QB_flat_parent_ids>
    </Item>
    <Item alias="Part BOM">
        <id>PB_1</id>
        <QB_flat_id>1</QB_flat_id>
        <QB_flat_parent_ids>0</QB_flat_parent_ids>
    </Item>
    <Item alias="Part BOM">
        <id>PB_2</id>
        <QB_flat_id>2</QB_flat_id>
        <QB_flat_parent_ids>0</QB_flat_parent_ids>
    </Item>
    <Item alias="Part BOM">
        <id>PB_3</id>
        <QB_flat_id>3</QB_flat_id>
        <QB_flat_parent_ids>0</QB_flat_parent_ids>
    </Item>
    <Item alias="Part">
        <id>REUSED_PART_ID</id>
        <QB_flat_id>4</QB_flat_id>
        <QB_flat_parent_ids>1,2</QB_flat_parent_ids>
    </Item>
    <Item alias="Part">
        <id>NON_REUSED_PART_ID</id>
        <QB_flat_id>5</QB_flat_id>
        <QB_flat_parent_ids>3</QB_flat_parent_ids>
    </Item>
    <Item alias="Part BOM">
        <id>PB_4</id>
        <QB_flat_id>6</QB_flat_id>
        <QB_flat_parent_ids>5</QB_flat_parent_ids>
    </Item>
    <Item alias="Part">
        <id>REUSED_PART_ID</id>
        <QB_flat_id>7</QB_flat_id>
        <QB_flat_parent_ids>6</QB_flat_parent_ids>
    </Item>
    <Item alias="Part Document">
        <id>PD_1</id>
        <QB_flat_id>8</QB_flat_id>
        <QB_flat_parent_ids>7</QB_flat_parent_ids>
    </Item>
</Result>
```

FIG. 15

<As_Built item_type="Project">VALUE</As_Built> ⟵1500
     │                              │
    1502                           1504

<As_Calculated rule="rule1" data_type="calculated" item_type="Project">VALUE</As_Calculated> ⟵1510
       │            │           │                                │              │
      1512         1514                                          1516           1518

<Item type = "Rule" id = "rule1" action = "if X, then Y"/> ⟵1520
       │              │              │
      1522           1524           1526

<As_Is item_type="Project">VALUE</As_Is> ⟵1530
     │                      │
    1532                   1534

CALCULATION ENGINE FOR PERFORMING CALCULATIONS BASED ON DEPENDENCIES IN A SELF-DESCRIBING DATA SYSTEM

CROSS-REFERENCES TO RELATED APPLICATIONS

This application claims priority to and the benefit of U.S. Non-Provisional application patent Ser. No. 17/526,511, filed Nov. 15, 2021, which claims priority to and the benefit U.S. Non-Provisional application patent Ser. No. 16/913, 537, filed Jun. 26, 2020, which issued as U.S. Pat. No. 11,175,914 on Nov. 16, 2021, which claims priority to and benefit of U.S. Provisional Application Patent Ser. No. 62/868,475, filed Jun. 28, 2019. The entire disclosures of the above-referenced applications are hereby incorporated by reference.

TECHNICAL FIELD

This disclosure relates generally to a self-describing data system. More specifically, this disclosure relates to a calculation engine for performing calculations based on dependencies in a self-describing data system.

BACKGROUND

The technical challenges associated with implementing a search, or query functionality on data expressed in certain markup languages and stored in a database, in particular, a relational database, such as a .SQL server database include, without limitation, difficulty in formulating and executing recursive search queries as well as searching across a dynamic data model. Specifically, recursive searches of relational databases require iterative and repetitive reformulation of the search query. Further, certain markup languages do not support query functionality across dynamic data models, as changes to the data model will block the execution of the search, typically resulting in an error message indicating that the database schema is different than an expected schema.

In addition, the values of certain fields in a database may depend on other values of other fields in the database. For example, in a project scheduling application, a start date for a task may depend on an end date of another task. There may be numerous other dates of tasks that directly or indirectly depend on the end date of the second task. If the end date of the second task is delayed, for one reason or another, the start date of the first task and the other dates of the other tasks may be impacted. Determining the impact on the various dependencies may be technically challenging to calculate for dynamic data models.

SUMMARY

This disclosure provides a calculation engine for performing calculations based on dependencies in a self-describing data system.

In a first embodiment, a method includes receiving a request to modify a first value of a first field of a first item in a self-describing data system, and obtaining a domain comprising a plurality of items in the self-describing data system. At least the first item and a second item are included in the plurality of items, and the second item comprises a second field having a second value. The method includes calculating, based on a rule of the second field of the second item, a dependency of the second value on the first value. The rule specifies how the second value of the second field is to be calculated using the first value of the first field. The method includes modifying, based on the request, the first value of the first field. The method includes receiving an event triggered by the modification to the first value of the first field. Responsive to the event, the method includes calculating the second value of the second field based on the rule, and storing the second value in the second field.

In a second embodiment, a tangible, non-transitory computer-readable medium stores instructions that, when executed, cause a processing device to perform the operations of the method described above.

In a third embodiment, a system includes a memory device storing instructions and a processing device communicatively coupled to the memory device, where the processing device executes the instructions to perform the operations of the method described above.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drive (SSD), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates an example of a tag creating an instance of an item in a self-describing data system according to various embodiments of this disclosure;

FIG. 3 illustrates an example of a configuration document for an item according to certain embodiments of this disclosure;

FIGS. 7A and 7B illustrate an example of a configuration document setting forth the configuration of a query based on a self-describing data model according to certain embodiments of this disclosure;

FIG. 8 at a structural level, an exemplary embodiment of an extension of a data model 800 for configuring recursive searches of a self-describing data system;

FIG. 9 illustrates an example of a query configuration document comprising an instance of an item belonging to the query parameter item type which provides a user-defined filter on the query response data set;

FIG. 10 illustrates an embodiment of a query configuration document comprising an instance of an item belonging to the query parameter item type;

FIGS. 12A and 12B illustrate an example of a markup language document comprising query results obtained and outputted according to various embodiments of this disclosure;

FIG. 13 illustrates of query results output in a tree grid format according to various embodiments of this disclosure;

FIGS. 14A and 14B illustrate query results outputted according to embodiments of this disclosure;

FIG. 15 illustrates examples of tags creating instances of <items> and <properties> in a self-describing data system according to various embodiments of this disclosure;

DETAILED DESCRIPTION

Figure 2:
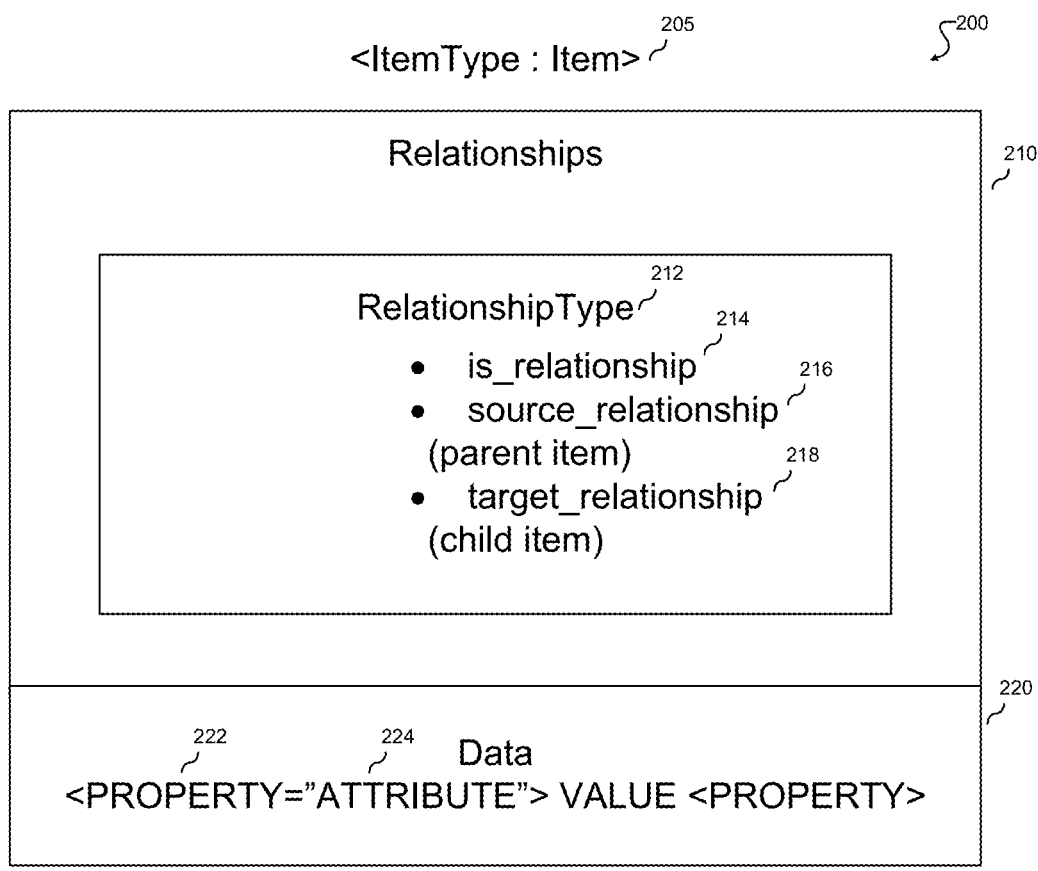
FIG. 2 illustrates, at a structural level aspects of the configuration of an item in a self-describing data system according to various embodiments of this disclosure.

There are a multitude of scenarios where values depend on each other. One example scenario may include project scheduling. In some scenarios, projects may be dependent on other projects within an overall project or projects may be dependent on a related project that is part of a different overall project. In any event, a single project, or multiple related projects, may include numerous tasks with dates (values) that are dependent on one another. The various tasks may have to start and/or complete for a certain milestone to be complete. Each of the tasks may include a scheduled start date, an actual start date, and a completion date. The scheduled start date for a first task may depend on the scheduled start date of a second task, the actual start date of the second task, or the completion date of the second task. If the date of the second task on which the first task depends is delayed or pushed back, the scheduled start date for the first task may be delayed or pushed back. If there are other tasks with scheduled start dates that depend on a date of the first task, the dates of those other tasks may be delayed or pushed back, as well. Thus, the modification to a single date of one project may have a large impact on a schedule of other projects and milestones may be missed.

In another scenario, multiple numbers (values) in a data table may directly or indirectly depend on a number in the data table. If the number is modified, the multiple numbers may be impacted. For example, if the number is increased, the multiple numbers may need to be identified and increased, or if the number is converted to a different unit, the multiple numbers may need to be identified and converted to the different unit. Determining the dependencies in a domain and the impact that modifications to values having dependencies in those domains may be technically challenging (e.g., there may be cost rollups, weight rollups, date scheduling, complexi numerical calculations and formulas, etc.).

Accordingly, in some embodiments, techniques are disclosed that enable calculating dependencies between items (e.g., tasks, projects, parts, numbers, etc.) in a self-describing data system and calculating new values for dependent items when a change is made to a value of one of the items. According to certain embodiments, the foundational element of a self-describing data system is an item, instances of which may be maintained in persistent storage in a relational database. An item is an instance of an ItemType. According to certain embodiments, the configuration and properties of an item may be expressed in a markup language, such as extensible markup language (XML), or Aras Markup Language (AML), which, as described in greater detail herein, follows a repeating "/Item/Relationships/Item/Relationships" pattern to describe item configurations.

When a request to modify a first value of a first field of a first item in the self-describing data system is received, a domain of items (including the item to be modified) may be obtained. A domain may refer to a set of data associated with the items of interest. As described further herein, a query definition may be formulated that defines the domain, and which can be collected across one or more different items types and/or relationships using user specified rules for filtering. The query definition may be executed to obtain the domain of items. In some embodiments, the relationships may specify dependencies between items. In some embodiments, the items may be projects items. Although project items are discussed throughout the majority of the calculation aspects of the present disclosure, it should be understood that the disclosed techniques may apply to any suitable items having dependencies in the self-describing data system.

Each project may include certain properties, which are columns in a data table for the project. A property is also an item. Some of the properties may enable calculating dependencies and new values for the project when a change is made to a value of one of the projects having the dependencies. The properties may include a field for an initial target value (also referred to as_built property herein), a field for a calculated value (also referred to as_calculated property herein), and a field for a final value (also referred to as_is property herein). The initial target value may be set by a user at an initial stage (e.g., a project manager may set a scheduled start date as the initial target value). The final value may be set when the project is complete. For example, the final value may be set to the completion date of the project.

The field of the calculated value may have a data type of "calculated". Having the calculated data type means the field has logic that specifies rules to be followed when certain events occur. The events may include a change to another value of another field of another item on which the calculated value depends in the self-describing data system, an addition of another value of another field of another item on which the calculated value depends in the self-describing data system, and/or a deletion of another value of another field of another item on which the calculated value depends in the self-describing data system. Any suitable event pertaining to the data in the self-describing data system is envisaged by the present disclosure.

The rules may specify how the value is to be calculated when certain events are triggered. The rules may be items having an item type of "rule". The rules may specify performing Boolean logic (if X, then Y), a date calculation (e.g., extend the date by X days when a date of a certain field is extended by X days), a summation operation, or any suitable calculation to handle an event that is triggered. The calculation may use the value of the field on which the calculated value depends. The calculated value may provide an event based calculation using logic to handle the events that are triggered.

The rules may specify the property or properties on which the calculated value depends. The properties may be other values of other fields, such as the as_built, the as_calculated, and/or the as_is. In some embodiments, the calculated value may depend on one property, while in other embodiments, the calculated value may depend on more than one properties. Accordingly, the rule may specify the dependencies pertaining to a calculated value for an item.

Using the domain of items, a representation of the items may be generated. In some embodiments, the representation may be a tree structure of nodes representing the items of the domain. The representation may be traversed beginning at a first node representing the item including the value the user requested to change. During the traversal, indirect and direct dependencies of the nodes on the first node may be calculated. More specifically, the indirect and direct dependencies of the values of the nodes on the first value of the first node may be calculated. A direct dependency may refer to a calculated value that includes a rule specifying to perform a certain calculation if an event happens to the first value. An indirect dependency may refer to a calculated value that includes a rule specifying to perform a certain calculation if an event happens to one or more other values and at least one of the one or more other values depends on the first value. For example, a first value may have first direct dependencies, the first direct dependencies may have second direct dependencies that also indirectly depend on the first value, the second direct dependencies may have third direct dependencies, that also indirectly depend on the first direct dependencies and the first value, and so on. Some embodiments enable calculating these dependencies and their calculated values based on their rules when certain events are triggered.

In some embodiments, the rules may be analyzed to calculate the dependencies of each of the nodes. A subset of nodes in the representation that include indirect or direct dependencies on the first value of the first node may be determined. The nodes that do not depend on the first value of the first node may be excluded from the subset of nodes. During the traversal, an optimal traversal path to calculate the values of the subset of nodes may be determined. In some embodiments, an indication may be stored (e.g., in a hash table) for a node when it is traversed is updated to ensure that a recalculation is not performed that may cause a circular loop of calculations to occur. If the node is reencountered during a calculation traversal, an error may be thrown indicating such, or a rule may specify allowing the node to be skipped and processing may proceed to the next node in the optimal traversal path.

The first value of the first field may be modified based on the request and the modified first value may be stored in the first field. The modification may trigger one or more events that affect one or more calculated values of one or more other items that directly or indirectly depend on the first value of the first field. The events may be handled by the rules of each of the one or more calculated values. The rules may specify how the calculated values are to be calculated. For example, a rule for a second value of a second field of a second item may directly depend on the first value, and the rule may specify that, if the first value is increased by X amount, then increase the second value by X amount. The calculated values of the nodes that directly or indirectly depend on the first value may be calculated based on their respective rules and stored in their respective fields in the self-describing data system.

For each of the nodes, the updated calculated value may be compared to the initial target value. In some embodiments, a graphical view may be presented that overlays the calculated values and the initial target values for the nodes. When there are discrepancies between the calculated value and the initial target value, a notification may be presented that specifies there is a discrepancy. For example, in the project scheduling scenario, the item may be a project, the initial target value may be a scheduled starting date, and the calculated value may be an actual start date. If the actual start date is later than the scheduled starting date, then the project is behind schedule. Further, all of the projects depending on that project may also be off schedule and each of those projects may be identified and presented in the graphical view.

The techniques disclosed herein improve the technology of calculating dependencies and calculating modifications to fields based on the dependencies. The techniques may scale for very large project(s) including hundreds, thousands, hundreds of thousands, etc. of items and their dependencies between those items. The techniques may handle scenarios where there are cross-dependencies between related projects by calculating the dependencies and traversing the representation to update the values based on the dependencies. The event based calculations may enable dynamically updating a data model when the events are triggered.

FIGS. 1 through 20, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

FIG. 1 illustrates an example of an <item> tag 100 defining an instance of an item in a self-describing data system according to various embodiments of this disclosure.

Further, in the non-limiting example of FIG. 1, <item> tag 100 defines an instance of an item, which is in turn, an instance of an ItemType, which is itself an item. In this way, the instance of an item defined by <item> tag 100 belongs to a self-describing data system. Further, in some embodiments each ItemType has a relational table in the database, whose columns map to the property names of the ItemType.

According to various embodiments, the instance of the item defined by <item> tag 100 comprises three principal attributes, a type 105, an ID 110 and an action 115. It should be noted that the following three attributes are not the only attributes which can be applied to an item.

In the non-limiting example shown in FIG. 1, type 105 comprises an ItemType name for the instance of the item defined by <item> tag 100. According to certain embodiments, type 105 expresses an ItemType name for the item defined by <item> tag 100. In the non-limiting example of FIG. 1, the name of the item type is the string "Part." According to various embodiments, the namespace for the "type" attribute is extensible and can be dynamically changed, as new names for ItemTypes become necessary. For example, in some embodiments, the item defined by <item> tag 100 may be a piece of data associated with a manufacturing process. In such cases, additional names for ItemTypes, such as "BOM" (Bill of Materials) may become necessary.

According to various embodiments, ID 110 comprises a unique identifier for the instance of an item created by <item> tag 100. In the non-limiting example of FIG. 1, ID 110 comprises the string "ABCDEF012345." According to certain embodiments, ID 110 provides, without limitation, a primary key for the instance of the item for the purposes of providing query results.

In some embodiments, action 115 comprises a method to be applied to the instance of an item defined by <item> tag 100. In the non-limiting example of FIG. 1, the method specified by action 115 is a "get." The instance of an item type defined by <item> tag 100 may, in some embodiments, include one or more Relationship tags, from which a query may be constructed. According to various embodiments, the methods specified by action 115 may be implemented by an API, for example, an API implementing the Aras Innovator Object Model or Item Object Model.

FIG. 2 illustrates, at a structural level, aspects of the configuration 200 of an item in a self-describing data system according to various embodiments of this disclosure.

Referring to the non-limiting example of FIG. 2, the item described by configuration 200 may be initially defined by an <item> tag 205, which according to various embodiments, embodies the syntax and three principal attributes of <item> tag 100 shown in FIG. 1.

According to certain embodiments, the configuration 200 of an item may be expressed as a markup language document (for example, an AML document). In some embodiments, item 200's configuration may be expressed through an "/Item/Relationships/Item/Relationships" pattern in an AML document. Further, the document expressing the configuration 200 of the item may contain data 220 (which are themselves, items), structure or relationships 210 (which are hierarchical items) and logic, which, as shown in the example of FIG. 1, may be expressed through an action attribute (for example, action 115 shown in FIG. 1) of each item.

In the non-limiting example of FIG. 2, relationships 210 comprise hierarchical items. According to certain embodiments, an item's relationship to one or more other items may be expressed through a RelationshipType item 212. In some embodiments, wherein the document setting forth an item's configuration is written in AML, an instance of a RelationshipType item may be defined by using the <Relationships> tag, which is a container tag holding a set of relationship items.

As shown in FIG. 2, according to certain embodiments, the set of relationship items may comprise one or more of the following three properties, an is_relationship 214, a source_relationship 216 and a target_relationship 218.

In some embodiments, when the RelationshipType 212 is created, is_relationship 214 is also created. Is_relationship 214 comprises an item, and its id is the value of the relationship_id property of RelationshipType 212. As such, is_relationship 214 operates to provide an ItemType pairing to RelationshipType 212, and to define a RelationshipType rule and an ItemType for storing the source_relationship 216 and target_relationship 218 properties of the RelationshipType item 212.

According to certain embodiments, source_relationship 216 is a property of RelationshipType 212 which comprises a link pointing to a child item. Similarly, target_relationship 218 is a property of RelationshipType 212, which comprises a link to a child item.

As shown in the non-limiting example of FIG. 2, the configuration 200 of an item may further comprise data 220 expressed as values of properties, wherein the properties may further be specified by attributes.

According to certain embodiments, a property 222 defines data for an item. Examples of properties may include, for example, a cost for an item, which could be expressed in AML or XML in the form: "<cost>232.13</cost>" indicating that a particular item has a cost value of "232.13" units.

According to certain embodiments, items of data for an item may be further specified with an attribute 224, which may be analogized as metadata for the item or property, and controlling logic and methods associated with the item. For example, an attribute may define a conditional, producing an AML or XML expression of the form "<cost condition="between">10.00 and 50.00</cost>". In this example, the property "cost" is further specified through the "between" attribute for which the values 10.00 and 50.00 are specified.

According to certain embodiments, the configuration 200 for an item may further include history data for the item, showing some or all of the previous configurations of the item.

FIG. 3 illustrates an example of a configuration document 300 for an item according to certain embodiments of this disclosure. As shown in the non-limiting example of FIG. 3, an instance of an ItemType is declared through an initial <item> tag 305, which specifies that this instance of an item is of the "Part" type and is associated with an "add" method.

The properties 310 of the item are set forth, and include an "item_number" value (which, according to certain embodiments, may function as a unique identifier of the instance of the item) and a "description" value, which, in this case is "Some Assy" (an abbreviation of "some assembly.")

Container tag 315 specifies that the item has relationships, including a first relationship 320 with item indicating an "add" method with an item of the type "Part BOM." Item configuration 300 further specifies a "related_id" (e.g., child relationship between the "Part BOM" item and a child "part" item 325. Thus, by applying the "/Item/Relationships/Item/Relationships" pattern, a part-to-part BOM relationship may be described.

Figure 4:
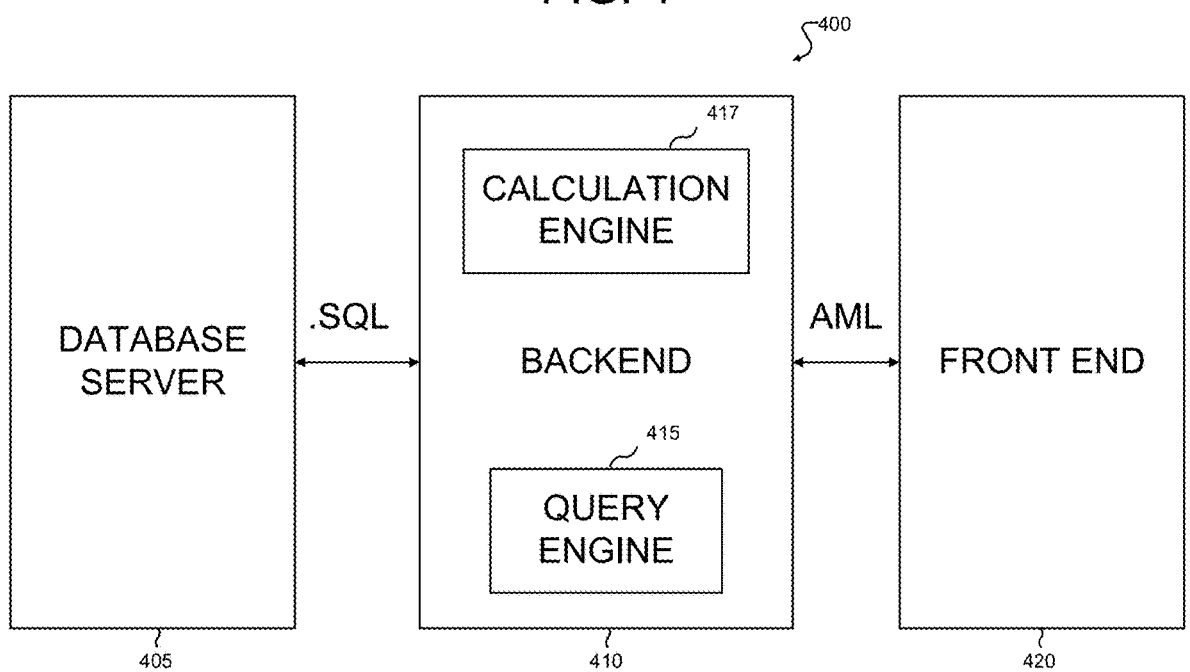
FIG. 4 illustrates an example of a system architecture for implementing a query engine for performing recursive searches in a self-describing data system according to various embodiments of this disclosure.

FIG. 4 illustrates an example of a system architecture 400 for implementing a query engine for performing recursive searches in a self-describing data system according to certain embodiments of this disclosure. In the non-limiting example of FIG. 4, network architecture comprises a database server 405, a backend server 410 implementing query engine 415 and calculation engine 417, and a front end 420. The query engine 415 and the calculation engine 417 may be implemented as computer instructions stored on one or more memory devices and executed by one or more processing devices.

According to certain embodiments, database server 405 is a server hosting data and implementing one or more database applications supporting query functionalities. Database server 405 is generally platform-agnostic and may host data in a number of known database formats, including a relational database format (for example, by running an instance of .SQL server) or as a columnar database format. In the non-limiting example of FIG. 4, database server 405 is communicatively connected to backend 410. In some embodiments, this connection is provided over a network link, and in some other embodiments, backend 410 and database server 405 may be embodied on the same piece of hardware. Skilled artisans will appreciate that embodiments according to this disclosure may be implemented on a variety of hardware platforms.

According to certain embodiments, database server 405 is configured to receive queries expressed as statements in a domain-specific language (for example, structured query language), and return results from the database hosted on database server 405. Database server 405 is also configured to receive commands (e.g., a calculation definition) pertaining to calculations to be made to values of properties of items in the database and execute the commands.

According to certain embodiments, backend 410 comprises a server or other computer configured to implement a query engine 415 configured to receive, from front end 420 query requests expressed in the syntax of a self-describing data system (for example, AML). As noted elsewhere, embodiments according to this disclosure are platform-agnostic and may be practiced across a wide range of hardware configurations and development environments. In some embodiments, query engine 415 may be implemented as an ASP.NET web service. Further, the backend 410 comprises the server or other computer that is configured to implement the calculation engine 417 configured to calculate values for items of properties based on dependencies between the items and one or more events.

In the non-limiting example of FIG. 4, front end 420 is communicatively connected (for example, via a network or being embodied on the same piece of hardware) to backend 410. According to certain embodiments, front end 420 comprises a web client of a web service provided by backend 410, and provides a user interface (UI) through which queries can be input and query outputs displayed as a user. Further, the UI may be used to request modifications to values of properties of items in the self-describing data system and to depict views of how the modification affects other values that depend on the modified value. In certain embodiments, front end 420 may be constructed using modules from the HTML 5 DOJO toolkit. According to certain further embodiments, front end 420 may provide an interface through which users can configure parameters of queries and set permissions for queries.

Figure 5:
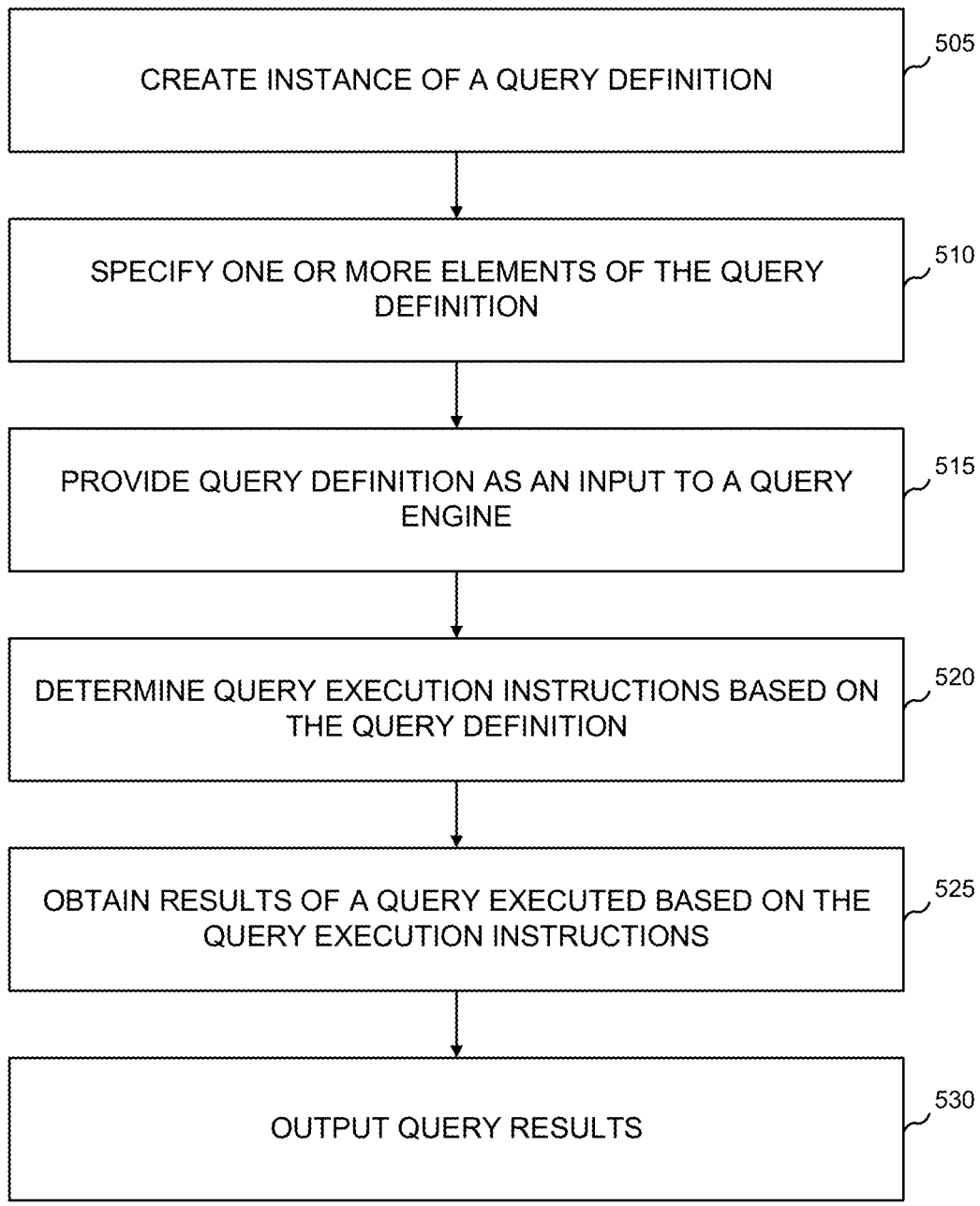
FIG. 5 illustrates operations of a query engine in one embodiment of a method for performing recursive searches in a self-describing data system.

FIG. 5 illustrates operations of a query engine in an example of a method 500 for performing recursive searches in a self-describing data system according to embodiments of this disclosure.

According to the non-limiting example of FIG. 5, method 500 includes operation 505, wherein the query engine creates an instance of a query definition. As discussed elsewhere in this disclosure, certain embodiments according to this disclosure utilize a self-describing data system, wherein the fundamental element of the data system is the item, which is an instance of an ItemType, which is, in turn, itself an item. Further, in certain self-describing data systems according to this disclosure, the configuration of items may be expressed through an "/Item/Relationships/Item/Relationships" pattern.

In some embodiments, a query definition is an item, and creating an instance of a query definition at operation 505 comprises beginning a markup language document (for example, an AML document) defining the configuration of the query definition. Further, a query definition may define the set of data (otherwise known as a domain) which a user is interested in seeing, and which can be collected across one or more different items types and/or relationships using user specified rules for filtering. Because a query definition defines the domain of a query, it may also be utilized to implement domain-based access controls to data items within the data structure.

According to certain embodiments, the AML document defining the configuration of the query begins with an instance of an <item> tag, an example of which is provided below:

```
<Item action="qry_Execute QueryDefinition"
    type="qry_QueryDefinition">
```

As shown above, according to some embodiments, an <item> tag creating an instance of a query definition specifies, at a minimum, a type of the instance of the query, which in this case, is a query definition (specified as "qry_QueryDefinition"), and a method, or action associated with the item, which in this case, is an instruction to execute a query, (specified as "qry_Execute Query Definition"). In some embodiments, the <item> tag creating the instance of the query definition item may further comprise a unique ID for the item, which in certain embodiments, may be advantageous if queries or query histories are stored in the data structure.

As shown in the non-limiting example of FIG. 5, method 500 includes operation 510, wherein the query builder, in response to a user input, specifies one or more elements of the query definition. According to certain embodiments, the one or more specified elements of the query definition may be specified as relationships, properties or attributes within the document providing the configuration of the query definition. Specifically, the one or more elements may be specified through additional items defining relationships or properties, including, without limitation, query items, query item selection properties, query item sort properties, query item available properties, query condition items and query reference items.

According to certain embodiments, method 500 includes operation 515, wherein the query definition is provided to a query engine. According to some embodiments, operations 505 and/or 510 may variously be performed at a front end client (for example, front end 420 shown in FIG. 4). According to other embodiments, operations 505 and/or 510 may be performed at the back end or programmatically at the query engine itself. According to certain embodiments, the query engine (for example, query engine 415 in FIG. 4) facilitates translating commands from a front end into query definitions, which are then converted into execution instructions to be passed to a database server (for example, database server 405 in FIG. 4). The query engine may further facilitate the construction of query definitions, and the provision of query results from the database server to the front end.

In some embodiments, method 500 also includes operation 520, wherein the query engine determines query execution instructions based on the received query definition. In the non-limiting example of FIG. 5, operation 520 comprises reading the query definition and translating it into a series of statements in the native language of the database server (for example, .SQL) and properly handling parameters defined within the query definition. As will be discussed further in this disclosure, as part of operation 520, the query engine may further specify an execution path for the query, as well as, where appropriate, recursion depths for recursive queries. In certain embodiments, the query execution instructions based on the query definition specify a recursive, level-by-level search of the data.

Additionally, in the non-limiting example of FIG. 5, the query execution instructions determined at operation 520 may be required to satisfy certain operational constraints, including without limitation, the ability to query a recursive structure, wherein a top level item is filtered by condition, while items from other levels are not filtered. Further, according to certain embodiments, querying a recursive structure must be performed without adding a "pseudo" top level item. Additionally, in certain embodiments, the execution instructions must enable a query of a recursive structure, wherein some intermediate level is filtered by a condition. Additionally, in some still further embodiments, the query execution instructions must enable limiting the depth of the retrieved structure, without modification of a recursive query topology.

According to various embodiments, at operation 525, the query engine obtains the results of a query executed based on the query execution instructions. According to certain embodiments, the results obtained at operation 525 may comprise generally unformatted data, and the query engine may assemble a response containing the results of the query.

In some embodiments, at operation 530, the query engine outputs the assembled query results. According to certain embodiments, operation 530 comprises returning the query response back to a user or application from which the request for a query was received (for example, front end 420 in FIG. 4). According to certain embodiments, the query results output at operation 530 may comprise a markup language document (for example, a document in XML, AML or some other extensible markup language dialect). According to other embodiments, at operation 530, the query engine may output query results as a flat output, a tree graph view or a graph visualization.

Figure 6:
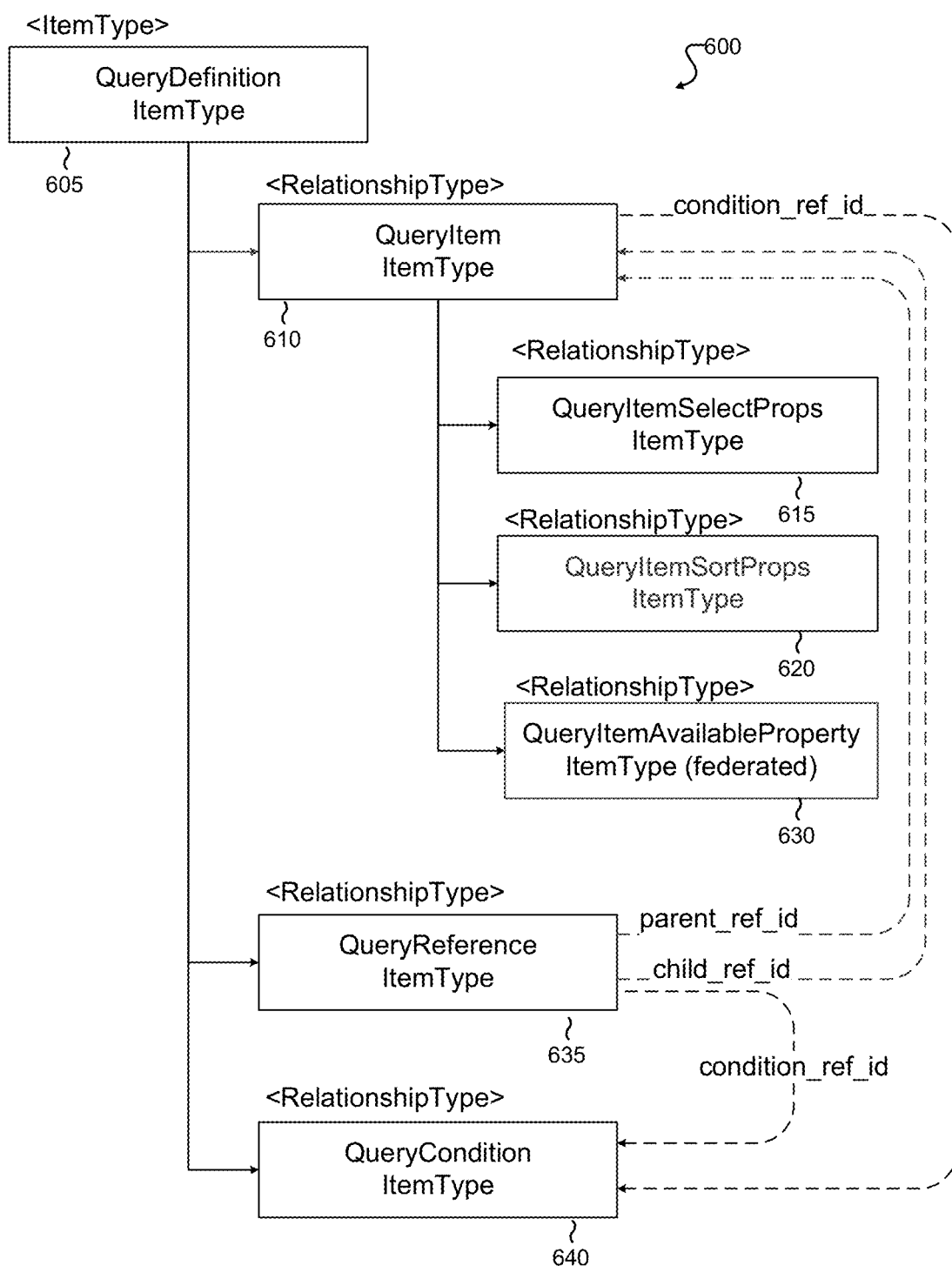
FIG. 6 illustrates, at a structural level, one example of a data model supporting a query definition item according to embodiments of this disclosure.

FIG. 6 illustrates, at a structural level, one example of a data model 600 supporting a query definition item according to embodiments of this disclosure. Note that, in this particular example, data model 600 comprises a hierarchical, tree like structure.

As shown in the non-limiting example of FIG. 6, data model 600 includes a query definition item 605, which occupies the top, or root level of the specified elements used to define a query. According to certain embodiments, query definition item 605 is an item of the "Query Definition" item type. Query Definition item 605 defines the set of data a user is interested in seeing. The data belonging to this set can be collected across one or more different Item Types using rules for filtering. Additionally, access controls can be implemented by defining additional filters excluding certain users from accessing (by including within the set of data encompassed by the user's query) data. According to certain embodiments, the properties of query definition item comprise a name, which can be a string specifying a unique name for the query definition. Additionally, the properties of query definition 605 can include a description, which can be a string or text describing the type of data represented by the query definition. Still further, the properties of the query definition can include a root query item id, which comprises a string representing the context item (also referred to as a root of the tree structure of data model 600) for query definition data model 600. According to other embodiments, properties of the query definition may include, without limitation, permissions.

According to certain embodiments, data model 600 is a self-describing data model which follows an "/Item/Relationship/Item/Relationship" description structure. Accordingly, in data model 600, a federated set of relationship properties 610 through 640 follow query definition 605. These relationships include query item 610. According to certain embodiments, query item 610 may appear as one or more <item> tags within a <relationship> container, such as shown in the example given in FIG. 3. Query item 610 is an item representing the source for properties, including properties to be selected and returned as part of the query response, and joins and filtering to be used, in the query definition. According to certain embodiments, the properties included in query item 610 include, without limitation, those set forth in Table 1 below:

TABLE 1

| Name | Label | Type | Description |
| --- | --- | --- | --- |
| classification | Classification | | Aggregation (GroupBy, SUM, AVG) Union Intersection Special Join |

TABLE 1-continued

| Name | Label | Type | Description |
| --- | --- | --- | --- |
| itemtype | ItemType | Item | ItemType which is described by Query Item (Item or Relationship) |
| Alias | Alias | String | Alias of Query Item which will be used in joins and conditions. |
| condition_ref_id | Referenced Condition | String | Referenced Query Condition. |
| ref_id | Reference ID | String | Reference ID of Query Item |

As shown in the non-limiting example of FIG. 5, query item 610 may have source and target relationships (such as described with respect to relationships 210 in FIG. 2) with other relationships within data model 600. For example, query item 610 may have both a parent and a child relationship with a query reference 635. Similarly, query item 610 may also be indicated as either the source or the target of a relationship with query condition 640.

According to certain embodiments, the relationships specified by data model 600 comprise query item selection properties 615, which define or identify which properties from query item 610 to include in the query response. An overview of the properties in one example of query item selection properties 615 is set forth in Table 2, below:

TABLE 2

| Name | Label | Type | Description |
| --- | --- | --- | --- |
| property_ref_id | Property | String | Reference to qry_QueryItemAvailable-Property via ref_id value. |

In some embodiments, the relationships specified by data model comprise query item sort properties 620, which define which properties from the associated query item are to be used for sorting data returned by the query, and how the sort is to be performed. An overview of properties of query item sort properties 620 is set forth in Table 3, below:

TABLE 3

| Name | Label | Type | Description |
| --- | --- | --- | --- |
| property_ref_id | Property | String | Reference to qry_QueryItemAvailable-Property via ref_id value. |
| sort_order | Sort Order | Integer | Order of sorting |
| sort_order_direction | Sort Order Direction | List | Values: Ascending, Descending |

According to various embodiments, the relationships specified by data model 600 further comprise query item available properties 630. In the non-limiting example of FIG. 6, query item available properties 630 define which federated properties from the associated query item to include in the query response. An overview of properties of query item available properties 630 is set forth in Table 4, below:

TABLE 4

| Name | Label | Type | Description |
| --- | --- | --- | --- |
| source_id | | Item (qry_QueryItem) | Reference to qry_QueryItem |
| name | Name | String | |
| label | Label | MLString | |
| type | Type | List | Data Type of the QueryItem property |
| ref_id | Reference ID | String | Reference ID (GUID) |

In the non-limiting example of FIG. 6, the relationships specified data model 600 further comprise query reference 635, which, like the other relationships shown in FIG. 6, may be expressed as an instance of an item within the <relationship> container tag. According to certain embodiments, query reference 635 defines join requirements between query items within the query definition, and as such, implements controls over how data is collected and aggregated across query items within the query definition which have relationships with one another. As shown in TABLE 5, below, in some embodiments, query reference 635 operates to specify relationships between query items in an analogous manner as relationships 212 in FIG. 2. An overview of properties of query reference 635 is set forth in Table 6, below:

TABLE 5

| Name | Label | Type | Description |
| --- | --- | --- | --- |
| parent_ref_id | Parent Item | String | Referenced parent Query Item. |
| child_ref_id | Child Item | String | Referenced child Query Item. |
| condition_ref_id | Referenced Condition | String | Referenced Query Condition. |

According to certain embodiments, the relationships specified within query definition data model 600 comprise query condition 640. Query condition 640 is an instance of an item which defines the filter conditions for the data request. According to certain embodiments, the scope of query condition 640 is the entity on which it is referenced, and a query condition can be optionally associated with a query item and query reference items. In the case where query condition 640 is referenced by a query item (for example, query item 610), then query condition filters the items defined by the query item. If, however, the query condition is referenced by a query reference (for example, query reference 635), it operates to filter the items defined by a query item referenced as the child query item for the query reference. An overview of properties of query condition 640 is set forth in Table 6 below:

TABLE 6

| Name | Label | Type | Description |
| --- | --- | --- | --- |
| condition_xml | Condition Xml | Text | Xml representation of specified conditions. |
| ref_id | Reference ID | String | Reference ID of Query Condition. |

FIGS. 7A and 7B illustrate an example of a markup language configuration document 700 setting forth the configuration of a query constructed based on a self-describing data model (for example, data model 600 in FIG. 6) according to embodiments of this disclosure.

As shown in the non-limiting example of FIGS. 7A and 7B, configuration document 700 includes an <item> tag 705 creating an instance of the query definition, whose properties include the action or method "qry_ExecuteQueryDefinition."

Referring to the non-limiting example of FIGS. 7A and 7B, configuration document 700 further includes three query condition items 710a, 710b and 710c specifying filters to be applied in the query. In this particular example, the properties of each of query condition items 710a through 710c are further specified by attributes further controlling the execution logic of the query. For example, in query condition item 710, the <condition> attribute is used to define the filter, as shown by the statement "<![CDATA[<condition> <eq> <property ref-id="TopPart_id_GUID"/><property ref-id="PBom_sourceId_GUID"/></eq></condition>]]>".

Configuration document 700 further includes query items 715a, 715b and 715c which, set forth properties to be part of the query response, and the properties to be used in joins and filtering. For example, query item 715a specifies an item, having the name "part" and the attribute "keyed_name," with the value "4F1AC04A2B484F3ABA4E20DB63808A88" as a filter for items to be returned by the query.

In the non-limiting example of FIGS. 7A and 7B, query document 700 further comprises query item selection properties 720a, 720b, 720c and 720d, which variously specify properties from query items 715a and 715c to include in the query response. For example, query item selection property 720a specifies the property "TopPart_id" as a property to be returned with query response items satisfying the filter criterion "keyed_name"="4F1AC04A2B484F3ABA4E20DB63808A88" specified by query item 715a.

Additionally, in this illustrative example, query document 700 further comprises an instance 725 of a query item sort property. In the non-limiting example of FIGS. 7A and 7B, instance 725 of a query item sort property specifies "TopPart_name" as the property to sort the items in the query response, and instance 725 of query item sort property includes the attribute "sort_order_direction" whose value "Ascending" indicates that the query response items are to be sorted by "TopPart_name" in ascending order.

As shown in the non-limiting example of FIGS. 7A and 7B, query document 700 further includes query reference items 730a and 730b, which specify how, in executing the query, data is collected and aggregated across query items which have relationships with other query items within the query definition. In this particular example, query reference items 730a and 730b specify join requirements, as shown, for example, by the property "<condition_ref_id>join_cond_1</condition_ref_id>" in query reference item 730a.

FIG. 8 illustrates, at a structural level, an exemplary embodiment of an extension of a data model 800 for configuring recursive searches of a self-describing data system.

In the non-limiting example of FIG. 8, data model 800 is represented as having a hierarchical tree structure, with query definition item 805 as the root, or context item type. Further, according to certain embodiments, data model 800 represents a query in a self-describing data system, whose elements follow a regular "/Item/Relationship/Item/Relationship" pattern.

Data model 800 may, according to various embodiments, include a variety of types of items 810 specifying relationships within the query definition. These items may comprise, for example, items 610-640 in FIG. 6, or a subset or superset thereof. Additionally, according to certain embodiments, data model 800 may further comprise items 815 belonging to the query parameter item type. According to various embodiments, query parameters comprise a user-defined parameter within query conditions which can be supplied at query execution time to override default values. Additionally, query parameters may also be used in other assignable values within a query definition, such as in offset and fetch values. The values for the parameters specified within the query parameter item may then be assigned at the time the query definition is to be executed.

Additionally, items 815 belonging to the query parameter item type may also be utilized to track or control aspects of the execution of a query. For example, according to certain embodiments, a user designed parameter "@ExecutionPath" is a dynamic parameter which may be calculated while processing a query definition to determine the progress of a query. Additionally, according to certain embodiments, items 815 belonging to the query parameter item type may also be used to define a query execution path, reflecting a route from a parent query item to a child query item in a query definition. Still further, items 815 belonging to the query parameter item type may be used to control the depth (i.e., how many levels are traversed) of recursion of a recursive query. According to some embodiments, a query engine (for example, query engine 415 in FIG. 4) will, by default and in the absence of a query parameter item specifying otherwise, exhaustively traverse all recursive paths.

FIG. 9 illustrates an embodiment of a query configuration document 900 comprising an instance of an item 905 belonging to the query parameter item type which provides a user-defined filter on the query response data set. As shown in the non-limiting example of FIG. 9, the container tag 907 "<Parameters>" signals the creation of the user-defined parameter having the name "@PartNumber," and the value "IN-0001." Further, as shown in FIG. 9, the parameter "@PartNumber" is specified as a filtering property 910 of a query response data set.

FIG. 10 illustrates an embodiment of a query configuration document 1000 comprising an instance 1005 of items belonging to the query parameter item type, by which the execution path of the query, in particular, the query recursion depth, may be controlled by defining a condition dependent on a value of the query parameter item. As shown in the non-limiting example of FIG. 10, an instance 1005 of the query parameter item defines the parameter named "@Levels," as being of an integer type. Once defined, the "@Level" parameter, in conjunction with the "@ExecutionPath" parameter is used as a value in conditional 1010, which determines the depth of the recursive query defined by query configuration document 1000.

Figure 11:
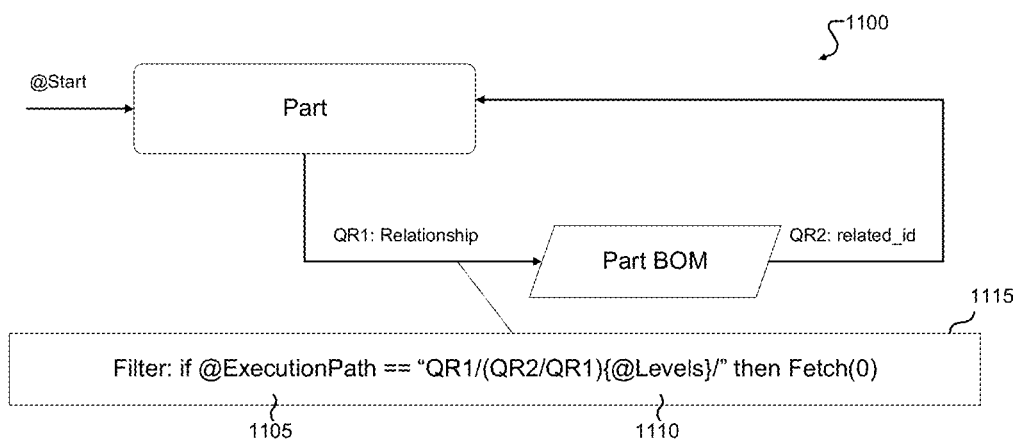
FIG. 11 illustrates, in wireframe format, an example of a query execution path for a query performed according to embodiments of this disclosure.

FIG. 11 illustrates, in wireframe format, a query execution path 1100 of a query (for example, the query described by query configuration document 1000 in FIG. 10). In the non-limiting example of FIG. 11, two items of the query parameter type are used to control query execution path. In this particular example, the first item 1105 of the query parameter type is the dynamic parameter "@ExecutionPath," and the second item 1110 of the query parameter type is the parameter "@Levels."

According to various embodiments, "@ExecutionPath" is a parameter calculated by a query execution engine (which according to certain embodiments, may be embodied as part of a query engine, such as, for example, query engine 415 in FIG. 4) tracking where the query execution engine is during the execution of a query definition. According to certain embodiments, query parameter "@ExecutionPath" is an item in a self-describing data system of the type "Path." In this particular example, the value of query parameter "@ExecutionPath" is a string reflecting a route from a parent query item (for example, query item 610 in FIG. 6) to a child query item via one or more query references (for example, query reference item 730a in FIG. 7).

In some embodiments, the query parameter "@Levels" is a parameter specifying the number of levels to "drill down" in a recursive search. Thus, in the example of FIG. 11, the execution path of the query, specifically, the items which are fetched while executing the query, is defined by the filter 1115 "if @ ExecutionPath="QR1/(QR2/QR1) {@Levels/}/" then Fetch(0)." In this non-limiting example, if the value of the parameter "@Levels" is zero, then the query pulls no items, because /QR1/(/(QR2/QR1){0}/ is equal to "/QR1/" limiting the path of the "Part" query to "Part BOM." If "@Levels"=1, then the query "drills down" one level and fetches the root "Part." If "@Levels"=2, then the query "drills down" two levels, fetching the root "Part" and its children. Similarly, if "@Levels"=3, then the query "drills down" three levels within the hierarchy of the data structure, fetching the root "Part", its children and their children.

After an execution engine implements execution instructions based on the query definition, query engines according to certain embodiments of this disclosure obtain the results of the executed query and output the query results.

Figure 12B:
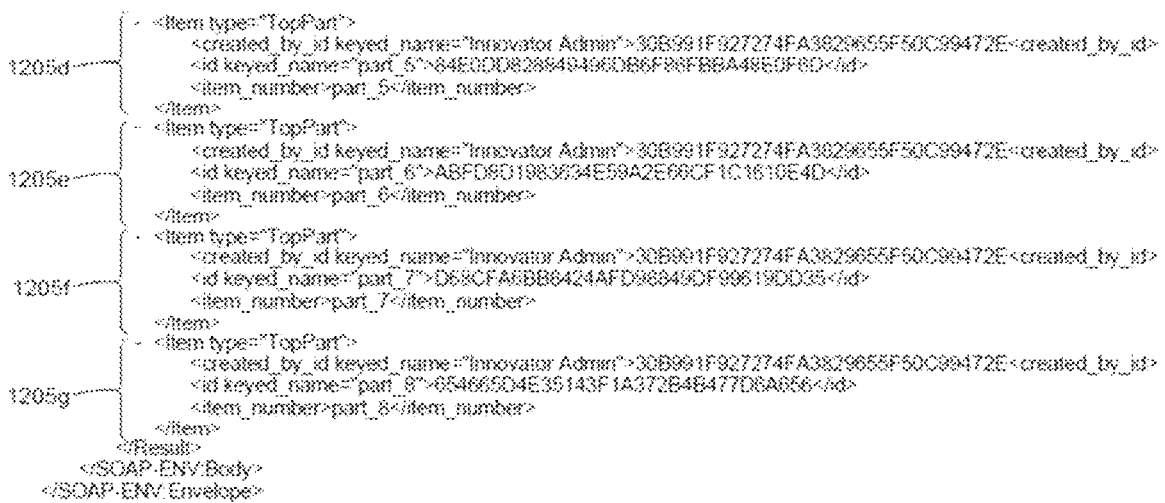

FIGS. 12A and 12B illustrate an example of a markup language document 1200 comprising query results obtained and outputted in a structured format. Specifically, markup language document 1200 comprises AML format results of the recursive query configured by query configuration document 700 shown in FIGS. 7A and 7B of this disclosure. According to certain embodiments, a query response, such as provided by document 1200 comprises the results of a query executed according to a query definition.

As shown in the non-limiting example of FIGS. 12A and 12B, query results 1200 mirror the "/Item/Relationship/Item/Relationship" structural pattern of the query definition and other documents constructed according to a self-describing data model. As shown in FIGS. 12A and 12B, the query returned results 1205a through 1205g, which, as specified by query item selection property 720c in FIG. 7 belong to the item type "Top Part." Further, as discussed elsewhere in this disclosure, in the absence of a query parameter item overriding a default recursion depth, the query was executed until a terminal node for each item in the query definition was reached, as shown by, for example, result 1205b.

According to certain embodiments, a query engine may output query results in a structured format, such as the structured format of the query definition (for example, as shown in FIGS. 12A and 12B) of this disclosure. According to certain other embodiments, the query engine may output results according to a different structural format, such as a graph visualization.

Figure 13:
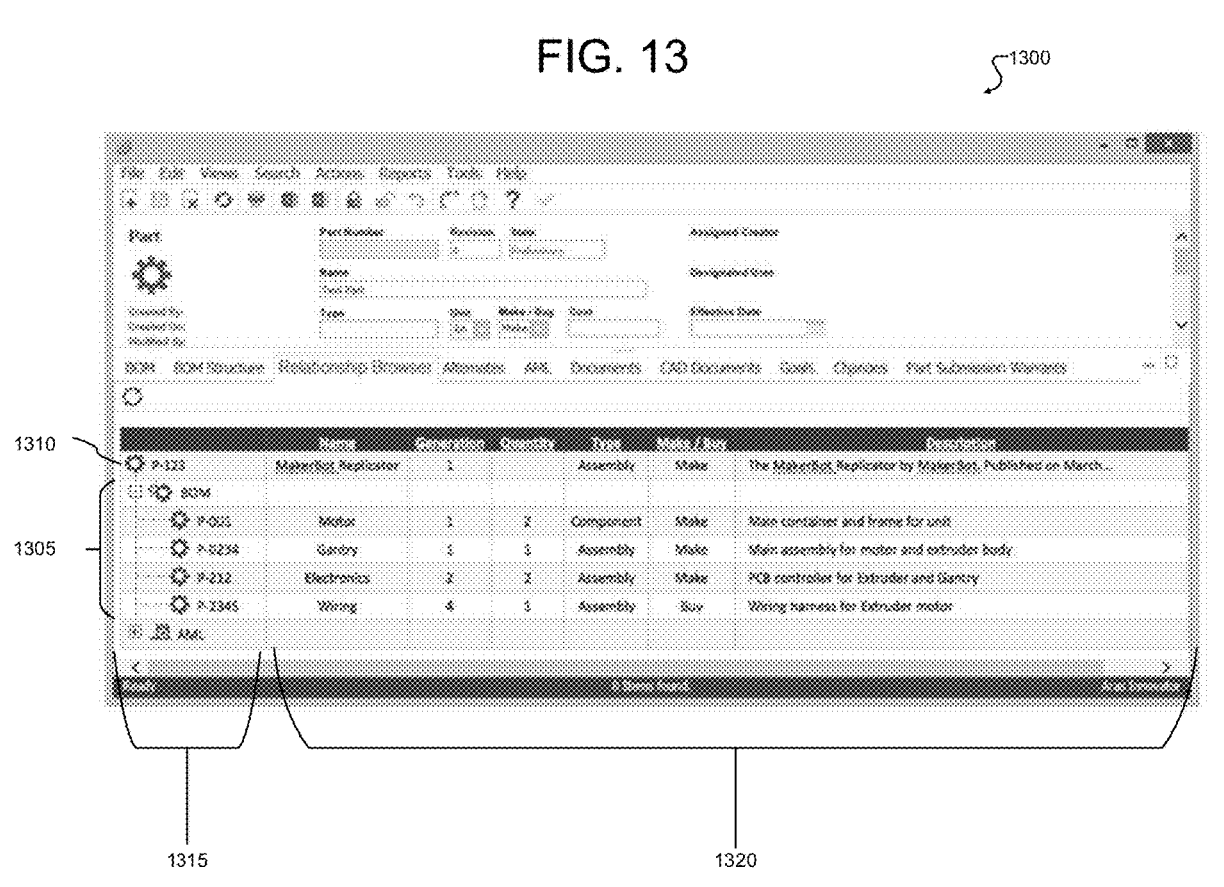

As shown by FIG. 13, a query engine according to certain embodiments of this disclosure may output query results in a tree grid format. In the non-limiting example of FIG. 13, a view 1300 of a user interface (such as presented by front end 420 in FIG. 4) showing query results 1305 in a tree grid view. According to embodiments, the tree grid view enables the query results to be displayed in a way that reflects the structure of the query definition by which they were obtained. As such, according to certain embodiments, query result items are displayed in a hierarchical manner reflecting their relationship to a context item, or root node, and which displays the relationship between items obtained by the executed query. In this particular example, query results 1305 are shown according to their relationship to context item, or root node "P-123," which in this example, corresponds to a "MakerBot Replicator." According to certain embodiments, the leftmost column 1315 of the tree grid view indicates hierarchical (i.e., parent-child relationship between the displayed items), while the columns to the right 1320 indicate properties of the items returned by the executed query.

According to certain embodiments or under certain conditions (for example, when performing very, very large queries, such as queries of a bill of materials for a helicopter, which when expressed as items in a self-describing data structure, may comprise a data structure with ~30,000,000 item nodes) the performance of the query engine may be improved by outputting the query results in a "flat" or unstructured format. In contrast to certain structured output formats according to embodiments of this disclosure, wherein the query results are outputted in a manner that reflects and allows reconstruction of, the hierarchy and relationships within the query structure and query execution path, a "flat" output may adhere to a simplified structure, wherein only "key properties" are displayed. In this way, the file size of the query result may be made more manageable.

FIG. 14A illustrates an example of a query result set 1400 of an executed query which has been output in a structured format, in this case AML. In this non-limiting example, a significant portion of the output 1405 is dedicated to </Relationship> container tags for expressing the hierarchy of relationships between items in the result set.

FIG. 14B illustrates an example of a query result set 1410 for the same query as in FIG. 14A, which has been output in a flat format with "id" defined as a key property of the output. Skilled artisans will appreciate that result set 1405 may be more readily processed than result set 1400 in the absence of an extended hierarchy defined by multiple </Relationship> container tags 1405. Further, according to certain embodiments, query result set 1400 may be readily converted into a structured result by calling the "qry_ConvertFlatToStructuredResult" method of the Aras IOM API.

The functionality and performance of query engines according to embodiments of this disclosure may be further enhanced by through the use of extended classification items. Extending the data model of a self-describing data system through the use of extended classifications may enhance the ability of the query engine to perform queries of polyhierarchical relationships, equivalence and associative relationships. Further, extended classifications according to embodiments of this disclosure may enhance the operation of a query engine, by enabling users to add additional properties to an item, without changing the underlying item type of the item. In this way, searches across the additional properties may be conducted quickly, in that the result set will not necessarily include null classes for the item instances not having the newly added (or extended) properties.

According to certain embodiments, an extended classification encompasses a kind of item, defining a collection of properties, which are specific to an object classified by a term. Further, in some embodiments, an extended property comprises a property which exists on a global scope and which is not specific to any one item type. According to certain embodiments, extended properties may be defined via one or more extended classifications.

FIG. 15 illustrates examples of tags 1500, 1510, 1520, and 1530 creating instances of <items> and <properties> in a self-describing data system according to various embodiments of this disclosure. As described above, properties may specify data for an item. The properties themselves are also instances of items. In some embodiments, instances of an as_built property, and as_calculated property, and an as_is property may be created for an item that has a dependency on another item. Some or all of these properties may be used to calculate the impact of modifying a value of an item that has dependencies and to provide notifications and/or block the modification to the value if there is an issue (e.g., as_calculated value is different than the as_built value). The properties may be columns in an ItemType data table associated with an item. For example, the properties may be columns in a data table for a project item, a part item, or any suitable item.

The properties may include attributes and/or values of data. The attributes may be metadata of the properties. For example, the as_built property tag 1500 may include an attribute 1502 for an item type that the property is referencing. As depicted, the attribute 1502 references a Project item, thereby creating a column for the as_built property tag 1500 in the data table for the Project item. Also, the as_built property tag 1500 may include a date (e.g., Jan. 1, 2020) for a project or task as its value 1504. The values associated with the as_built property tag 1500 may be initial target values for the item. If the item is a project, the value may be a scheduled start date for the project, in some embodiments. If the item is a part, the value may be an estimated numerical cost of the part, a quantity number of the part, or the like.

The as_calculated property tag 1510 may include one or more attributes 1512, 1514, and 1516. The attribute 1512 is a rule that indicates "rule1" is the rule that specifies how the value 1518 is to be calculated when one or more events are triggered. The attribute 1514 is a data type for the as_calculated property 1510. The data type is specified as "calculated," which may indicate that the value 1518 of the as_calculated property tag 1510 is calculated based on one or more other values of one or more other items in the self-describing data system in accordance with rule1. Further, the attribute 1516 is a reference to an item type "Project," thereby creating a column for the as_calculated property tag 1510 in the data table for the Project item.

As depicted, <item> tag 1520 defines an instance of an item, which is in turn, an instance of an ItemType, which is itself an item. In this way, the instance of an item defined by <item> tag 1520 belongs to a self-describing data system. Further, in some embodiments each ItemType has a relational table in the database, whose columns map to the property names of the ItemType.

The instance of the item defined by <item> tag 1520 comprises three principal attributes, a type 1522, an ID 1524 and an action 1526. It should be noted that the following three attributes are not the only attributes which can be applied to the item. According to certain embodiments, the type 1522 expresses an ItemType name for the item defined by <item> tag 1520. As depicted, the name of the item type is the string "Rule."

According to various embodiments, the ID 1524 is a unique identifier for the instance of a Rule item created by <item> tag 1520. As depicted, ID 1524 comprises the string "rule1," which is referenced as the rule to be used for the as_calculated property tag 1510. The action 1526 may specify logic that is executed when the rule is used. The logic of the rule may specify operations that depend on events occurring to one or more other properties of items in the self-describing data system. For example, the operations may be Boolean logic, as depicted, of "if X, then Y," where X may be an event and Y may be the calculation to perform on the value of the as_calculated property referencing the rule. For example, the Boolean logic may specify "if [the value of the as_built property of project 123 is modified], then [calculate the value of this item's as_calculated property the same as the value of the as_built property of project 123]". In some instances, the operations that are specified in the calculation of the value of the as_calculated property may be date calculations, summations, unit conversions, divisions, subtractions, multiplications, or some combination thereof. The calculations may use some combination of one or more values of as_built properties, as_calculated properties, and/or as_is properties. The particular calculation may be specified in a query definition that is executed on the self-describing data system. A query definition for an item may define calculating the value for the as_calculated property for that item, or the query definition may define calculating the values of as_calculated properties for numerous items. According to various embodiments, the logic specified by action 1526 may be implemented by an API, for example, an API implementing the Aras Innovator Object Model or Item Object Model.

The as_is property tag 1530 may include an attribute 1532 for an item type that the property is referencing. As depicted, the attribute 1532 references a Project item, thereby creating a column for the as_built property tag 1530 in the data table for the Project item. Also, the as_is property tag 1530 may include a date (e.g., Jan. 1, 2020) for a project or task as its value 1534. The values associated with the as_is property tag 1530 may be final values for the item. If the item is a project, the value may be a completion date for the project, in some embodiments. If the item is a part, the value may be a final numerical cost of the part.

Figure 16:
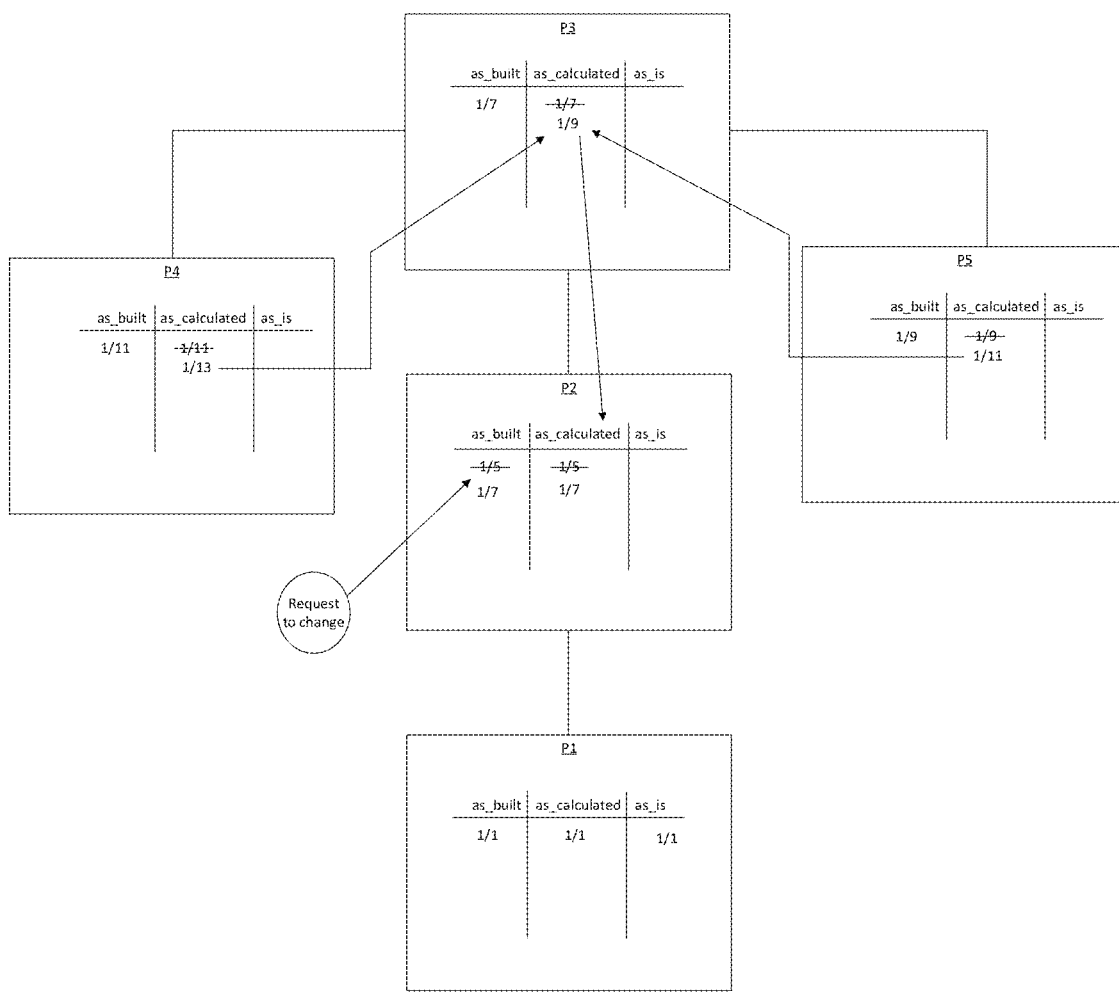
FIG. 16 illustrates example project items having values calculated based on dependencies according to various embodiments of this disclosure.

FIG. 16 illustrates example project items P1, P2, P3, P4, and P5 having values calculated based on dependencies according to various embodiments of this disclosure. Although project items are depicted, it should be understood that any suitable item type may be used with the disclosed techniques. As depicted, project item P2 depends on project item P1, and project item P3 depends on project item P2 within the same project tree. Project item P4 and project item P5 are in separate project trees, but both project item P4 and project item P5 cross-depend on project item P3.

Each of the project items P1, P2, P3, P4, and P5 includes properties for as_built, as_calculated, and as_is. The values of the as_built property may be dates that are set by a user (e.g., project manager, administrator, etc.) during a project scheduling phase. The value of the as_built property for project item P1 may be set to 1/1 (January 1), the value of the as_built property for project item P2 may be set to 1/5, the value of the as_built property for project item P3 may be set to 1/7, the value of the as_built property for project item P4 may be set to 1/11, and the value of the as_built property for project item P5 may be set to 1/9.

In some embodiments, initially, the dates of the as_calculated properties may be empty or may be set by default to the same date as the as_built property. One or more rules for the as_calculated property may specify how the value is to be initially calculated. For example, the value of the as_calculated property for project item P1 may be set to 1/1 (January 1), the value of the as_calculated property for project item P2 may be set to 1/5, the value of the as_calculated property for project item P3 may be set to 1/7, the value of the as_calculated property for project item P4 may be set to 1/11, and the value of the as_calculated property for project item P5 may be set to 1/9.

The dates of the as_is properties may be empty when the projects have not completed. When the project is completed, the as_is date may be set to the completion date.

As depicted, each date of the as_built of a subsequent project item is later than the date of the as_built property of the project item on which the subsequent project item depends. If the date changes of the project item on which the subsequent project item depends, the date of the subsequent project item may be affected. Using the disclosed techniques, the impacts to the various dates in the project items may be calculated based on one or more events (e.g., a value being modified) and dependencies between the project items, and the impact to the overall project may be identified and presented to a user via the frontend 420.

A request may be received to modify the value of an as_built property for project item P2. For example, a user associated with project item P2 may determine that the project has to be delayed by two days until 1/7 and request to modify the as_built date. When the request is received a query definition may be generated to obtain the domain of items associated with the project item P2. Also, as further discussed with reference to FIG. 17, a representation of the domain of items may be generated. The representation may be traversed to calculate dependencies between the project items and to calculate the values of the as_calculated properties of the project items.

As depicted, when the date of the as_built property for project item P2 is changed from 1/5 to 1/7, the date of the as_calculated property for project item P2 may also be changed from 1/5 to 1/7. One or more rules of the as_calculated property for project item P2 may specify how the value is calculated when the value of the as_built property for project item P2 changes.

As shown by the arrow from the as_calculated property of project item P3 to the as_calculated property of project item P2, the as_calculated property of project item P3 depends on the as_calculated property of project item P2. Modifying the value of the as_calculated property of project item P2 may cause an event to be triggered that drives the calculation of a modified value for the as_calculated property of project item P3. As discussed above, one or more rules may specify how to calculate the value of the as_calculated property of project item P3 based on the modification to the value of the as_calculated property of project item P2. In the depicted example, the rule specifies calculating a date for the as_calculated property of project item P3 having the same number of day extensions (e.g., 2) as the as_calculated property of project item P2. Thus, the date of the as_calculated property of project item P3 is increased from 1/7 to 1/9.

In some embodiments, the discrepancy between the value (1/7) of the as_built property of project item P3 and the value (1/9) of the as_calculated property of project item P3 may be detected and a notification may be presented that the schedule for project item P3 is off track. In some embodiments, if such a discrepancy is not acceptable, the change to the as_built property of project item P2 may be prevented.

As shown by the arrow from the as_calculated property of project item P4 to the as_calculated property of project item P3, the as_calculated property of project item P4 depends on the as_calculated property of project item P3. Modifying the value of the as_calculated property of project item P3 may cause an event to be triggered that drives the calculation of a modified value for the as_calculated property of project item P4. As discussed above, one or more rules may specify how to calculate the value of the as_calculated property of project item P4 based on the modification to the value of the as_calculated property of project item P3. In the depicted example, the rule specifies calculating a date for the as_calculated property of project item P4 having the same number of day extensions (e.g., 2) as the as_calculated property of project item P3. Thus, the date of the as_calculated property of project item P4 is increased from 1/11 to 1/13.

As shown by the arrow from the as_calculated property of project item P5 to the as_calculated property of project item P3, the as_calculated property of project item P5 depends on the as_calculated property of project item P3. Modifying the value of the as_calculated property of project item P3 may cause an event to be triggered that drives the calculation of a modified value for the as_calculated property of project item P5. As discussed above, one or more rules may specify how to calculate the value of the as_calculated property of project item P5 based on the modification to the value of the as_calculated property of project item P3. In the depicted example, the rule specifies calculating a date for the as_calculated property of project item P5 having the same number of day extensions (e.g., 2) as the as_calculated property of project item P3. Thus, the date of the as_calculated property of project item P5 is increased from 1/9 to 1/11.

Figure 17:
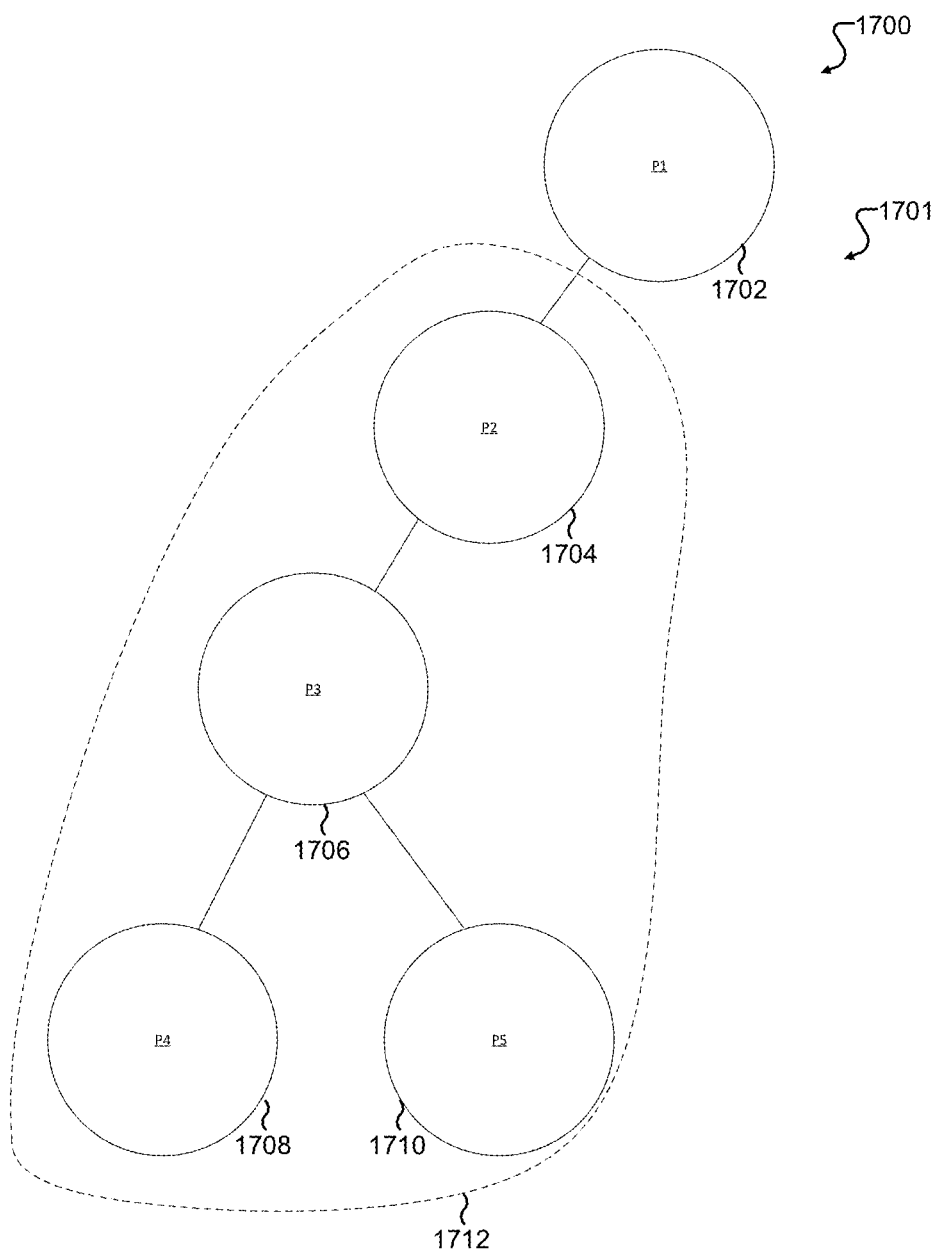
FIG. 17 illustrates an example representation of a domain of items that is generated according to various embodiments of this disclosure.

FIG. 17 illustrates an example representation 1700 of a domain 1701 of items that is generated according to various embodiments of this disclosure. The representation may be a tree structure where each node in the tree structure represents an item of the domain returned by the executed query definition. The nodes in the representation 1700 may include a root node 1702 representing project item P1 since it has the earliest date on which each of the project items P2, P3, P4, and P5 directly or indirectly depend. The representation 1700 may include a node 1704 representing project item P2 that directly depends on node 1702 representing project item P1. The representation 1700 may include a node 1706 representing project item P3 that directly depends on node 1704 representing project item P2 and indirectly depends on node 1702. The representation 1700 may include a node 1708 representing project item P4 that directly depends on node 1706 representing project item P3 and indirectly depends on nodes 1704 and 1702. The representation 1700 may include a node 1710 representing project item P5 that directly depends on node 1706 representing project item P3 and indirectly depends on nodes 1704 and 1702.

Continuing with the example discussed with reference to FIG. 16, when the request is received to modify the value of the as_built property of the project item P2, the domain of items associated with project item P2 may be obtained and the representation 1700 may be generated. Although the values of the properties in project item P1 are not affected by the change to the value of the as_built property of project item P2, project item P1 is returned as part of the domain of items associated with project item P2 because project item P2 depends on project item P1.

In some embodiments, the representation 1700 may be traversed starting at the project item P2 to calculate the dependencies of project item P2 and to build a sub-domain 12 of a subset of nodes that need to be updated based on the dependencies. In some embodiments, the dependencies may be calculated based on the one or more rules defined for the as_calculated properties of each of the project items. For example, the rule for the as_calculated property of project item P3 may specify that the value is calculated based on the value of the as_calculated property of project item P2. That is, the rule specifies that the as_calculated property of project item P3 depends on the value of the as_calculated property of project item P2. Each node P3, P4, and P5 may be traversed and its dependency on project item P2 may be calculated. In some embodiments, the relationships that are defined for the items may also indicate dependencies between the items and the dependencies may be calculated based on the relationships.

As depicted, the calculated dependencies result in the sub-domain 1712 being identified that includes nodes 1702, 1706, 1708, and 1710. Since project item P1 is not affected by a change to a value of the project item P2, the node 1702 representing project item P1 is excluded from the sub-domain 1712. In some embodiments, the sub-domain 1712 may be stored in memory for efficient access if another request is made to change a value of project item P2. A background process (e.g., a daemon) may execute to update the subset of nodes in the sub-domain 1712. For example, when a new dependency is added, the sub-domain 1712 may be updated with a new node and stored in memory. In some embodiments, the sub-domain 1712 may be dynamically calculated each time a request is received. Dynamically calculating the sub-domain 1712 may be computationally beneficial if the project items and their dependencies are changing at a threshold rate. If the project items and their dependencies in the sub-domain 1712 change at less than the threshold rate, then it may be computationally beneficial to store the sub-domain 1712 in memory.

In addition, during the traversal of the representation 1700 starting at the node 1704 representing project item P2, an optimal traversal path may be determined. The optimal traversal path may refer to a path of nodes to traverse the tree in the shortest amount of moves and/or processing time. The optimal traversal path may be used to calculate the values of the subset of nodes in the sub-domain 1712. While determining the optimal traversal path, a node may be encountered more than one time. For example, while traversing the representation 1700, node 1706 may be encountered a first time and processing may continue to node 1708, but to get to node 1710, node 1706 may be reencountered. In such a scenario, the value of the as_calculated property of project item P3 at node 1706 may calculated the first time the node 1706 is encountered. It may be undesirable to recalculate the value of the as_calculated property of project item P3 when the node 1706 is reencountered.

As such, a mechanism may be implemented that stores an indication (e.g., hash value) for project item P3 in a data structure (e.g., hash table) when the node 1706 is encountered the first time. When the node 1706 is reencountered, the indication may be identified and a rule may specify performing one of the following: skipping over the node 1706 (e.g., without recalculating its value) and traversing to node 1710, or throwing an error indicating the value of the as_calculated property of project item P3 at node 1706 has already been encountered. In this way, the mechanism may enable handling cross-dependencies between project items that result in separate branches in the representation of the project items.

Upon determining the optimal traversal path, the sub-domain 1712 including the subset of nodes 1704, 1706, 1708, and 1710 may be traversed using the optimal traversal path to calculate the values of the as_calculated properties of each of the project items P2, P3, P4, and P5 using the respective rules that specify how to calculate the values. The calculated values may be stored at fields for the as_calculated properties associated with the respective project items in the self-describing data system. The newly calculated values for the as_calculated properties may be compared to the as_built and/or as_is properties for the respective project items to determine whether a schedule has been impacted by the modification to the value at project item P2.

Figure 18:
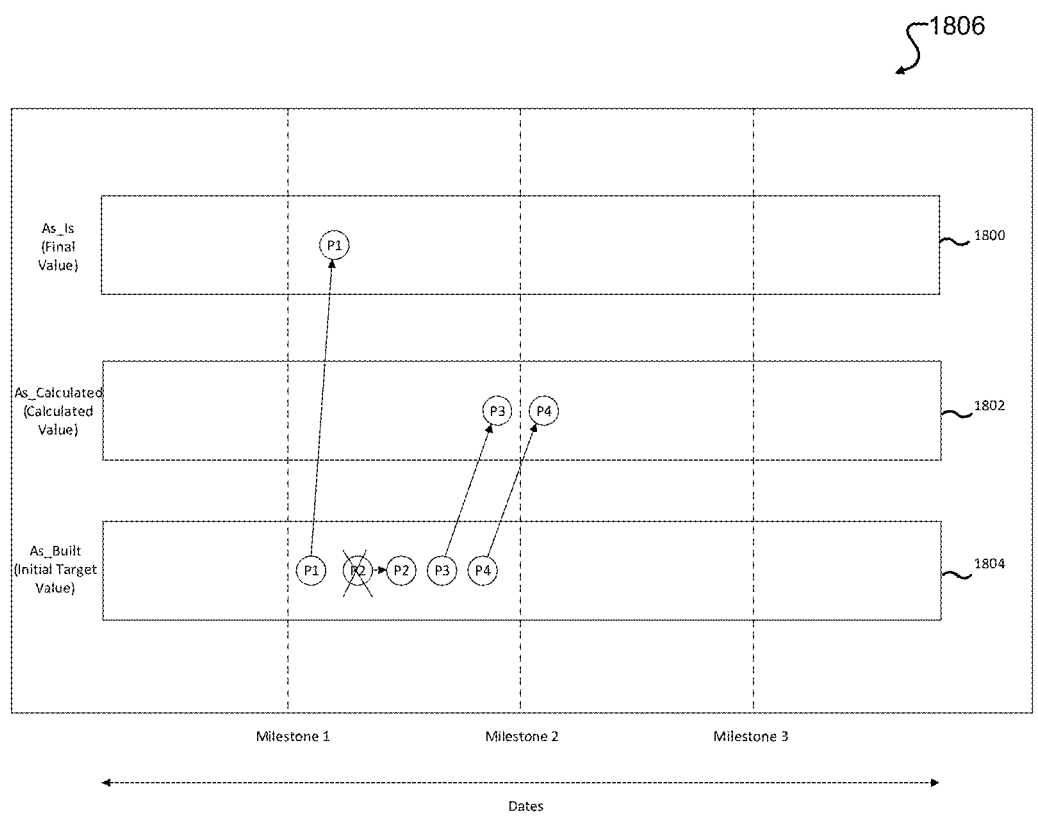
FIG. 18 illustrates example views of values for project items according to various embodiments of this disclosure.

FIG. 18 illustrates example views 1800, 1802, and 1804 of values for project items according to various embodiments of this disclosure. The views 1800, 1802, and 1804 may be presented in a user interface 1806 on the frontend 420. The view 1800 may be associated with final values of the as_is properties for the project items, the view 1802 may be associated with calculated values of the as_calculated properties for the project items, and the view 1804 may be associated with initial target values of the as_built properties for the project items. Various milestones, such as milestone 1, milestone 2, milestone 3, etc. may be presented on the user interface 1806. The milestones may be any suitable milestone pertaining to any type of project. In one example, the milestones may be different stages of a waterfall software development lifecycle. For example, milestone 1 may be requirements gathering, milestone 2 may be design, milestone 3 may be development, etc. Dates may be depicted along an X-axis of the views 1800, 1802, and 1804.

As depicted in view 1804, project items P1, P2, P3, and P4 have initial target values for the as_built property scheduled in order to achieve milestone 2 by a certain date. Project item P1 may be completed and the final value of the as_is property may be updated to reflect the completion date. The view 1800 may depict project item 1 at the completion date. In the depicted example, the initial target value for project item P2 may be pushed back (represented by the X) for some reason. As such, the date is moved further back represented by the arrowing shifting project item P2 in the view 1804. Project items P3 and P4 may depend on the as_built property of project item P2. The dependencies may be calculated as described herein. Modifying the initial target value of the as_built property of project item P2 may trigger an event to be handled by one or more rules of the as_calculated properties of the project items P3 and P4. The respective rules may specify how to calculate the value of the as_calculated property for respective project items P3 and P4.

As depicted in the view 1802, the pushed back date of the as_built property of project item P2 causes the calculated value of the as_calculated property for project items P3 and P4 to be pushed back. By comparing the view 1802 and 1804, it can be easily seen and understood that the calculated value of the as_calculated property for project item P4 extends past the milestone 2 completion date. This issue may be flagged and a notification may be presented indicating that milestone 2 will be missed if the change is made to the initial target value of the as_built property of project item P2. Such a user interface 1806 with the views 1800, 1802, and 1804 may improve the user experience using a computer to schedule projects by presenting the pertinent information for multiple projects in the user interface 1806 and providing notifications.

Figure 19:
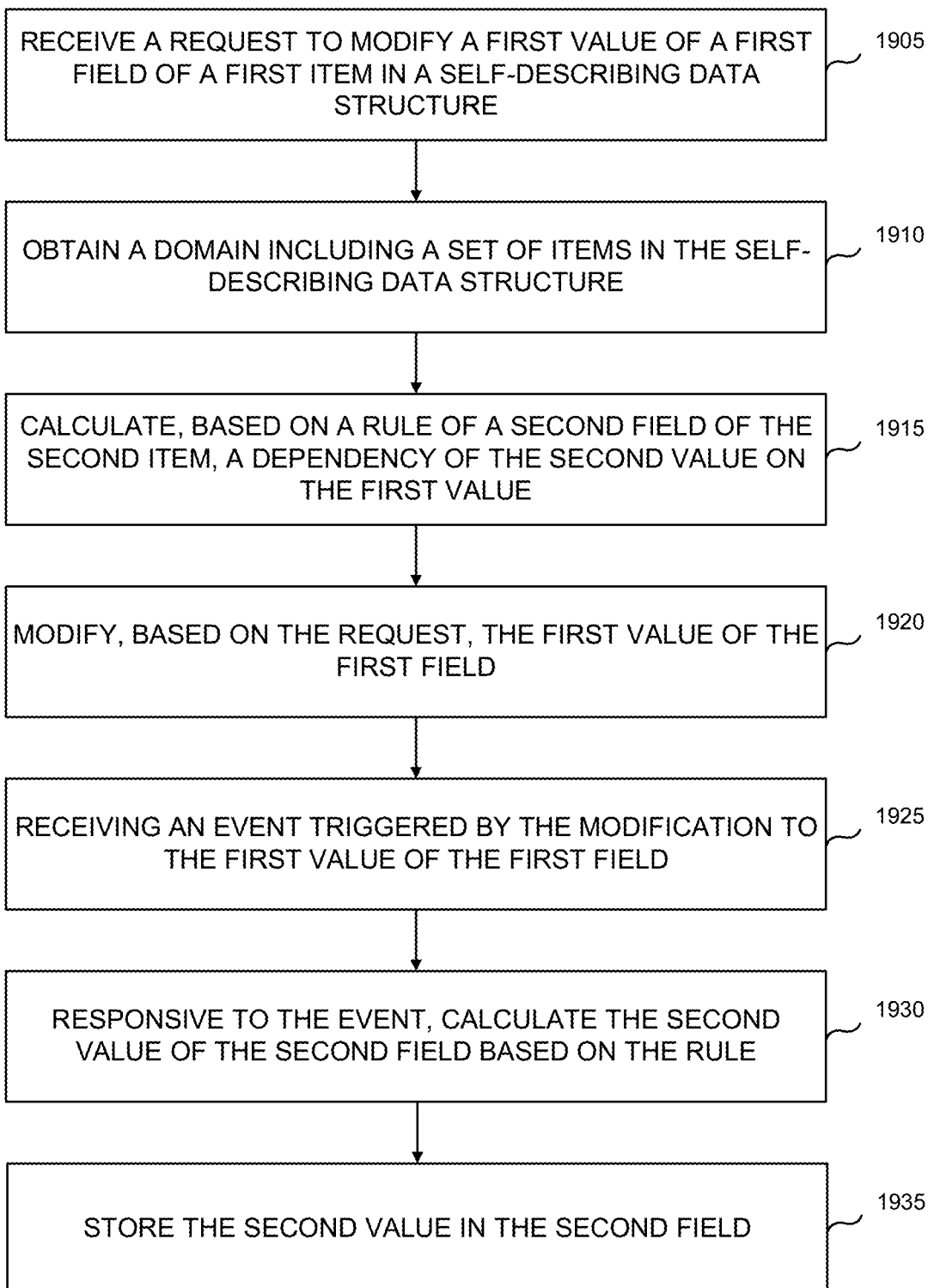
FIG. 19 illustrates an example method for performing a calculation based on a dependency in a self-describing data system according to various embodiments of this disclosure.

FIG. 19 illustrates an example method 1900 for performing a calculation based on a dependency in a self-describing data system according to various embodiments of this disclosure. One or more operations of the method 1900 may be performed by one or more processing devices executing the calculation engine 417 and/or the query engine 415.

According to the non-limiting example of FIG. 19, method 1900 includes operation 1905, wherein a processing device may receive a request to modify a first value (e.g., a date, a number, a unit, etc.) of a first field (e.g., as_built property, as_calculated property, as_is property) of a first item (e.g., a project item) in a self-describing data system. The request may be submitted by the user using a user interface presented by the frontend 420 on a computing device. For example, the user may request to change a date for a particular project that is part of a larger project where numerous other projects directly or indirectly depend on the particular project.

At operation 1910, the processing device may obtain a domain including a set of items in the self-describing data system. At least the first item and a second item (e.g., a project item) are included in the set of items in the domain. The second item may include a second field (e.g., as_calculated property) having a second value. The second field may have a data type (e.g., "calculated") that indicates the second value is a calculated value. The domain may be obtained by generating a query definition as described herein and executing the query definition. In some embodiments, the domain of items may include derived relationships that define the dependencies between the items.

At operation 1915, the processing device may calculate, based on a rule of a second field (e.g., as_calculated property) of the second item, a dependency of the second value on the first value. The rule may specify how the second value of the second field is to be calculated using the first value of the first field. In other words, the rule may specify that the second value depends on the first value, and in some embodiments, the modification to the first value may affect the modification to the second value. In some embodiments, the relationships defined for the second item may specify that the second value depends on the first value. The calculation of the second value may involve any suitable operation(s) using the first value, such as Boolean operations, mathematical operations (e.g., summations, averaging, subtractions, multiplications, divisions, etc.), date calculation operations, unit conversion operations, or some combination thereof.

In some embodiments, the rules may be defined using a graphical user interface (GUI). The GUI may include user interface elements that enable building dependencies between values of fields of items. For example, the user interface elements may enable specifying the value of the as_calculated property is calculated based on two specific values of two other fields of two other items and added to a summation across all related items. The operations that are available to perform in the calculation may be exposed via a user interface element and selectable by the user to apply to a desired as_calculated property of an item. The GUI may provide a visual system for structuring dependencies and calculations in the self-describing data system.

At operation 1920, the processing device may modify, based on the request, the first value of the first field. The modified first value may be stored in the first field.

At operation 1925, the processing device may receive an event triggered by the modification to the first value of the first field. The event may drive the calculation of the second value in accordance with the rule for the second field.

At operation 1930, responsive to the event, the processing device may calculate the second value of the second field based on the rule. The calculation of the second value may be defined in a query definition that is executed to perform the calculation. The calculation of the second value may be stored as a process in a queue mechanism. If there are numerous other values that directly or indirectly depend on the first value and are to be calculation, those calculations may also be stored as processes in the queue mechanism to enable efficient throughput of the calculations.

The processing device may compare the second value to an initial target value (e.g., of the as_built property) of the second item. Responsive to determining the second value differs from the initial target value, the processing device may provide a notification indicating there is a difference between the second value and the initial target value for the second item. The notification may indicate that the modification to the first value of the first item was prevented in some scenarios. The values (e.g., as_built property, as_calculated property, as_is property) associated with the items may be presented in one or more views on a user interface.

At operation 1935, the processing device may store the second value in the second field. There may be other items that depend on the second item. For example, in some embodiments, the processing device may calculate, based on another rule of a third field of a third item included in the set of items, a dependency of a third value on the second value of the second field. The another rule may specify how the third value of the third field is to be calculated using the second value of the second field. The processing device may receive another event triggered by the modification to the second value of the second field described above that resulted from the second value being dependent on the first value that was modified. Responsive to the another event, the processing device may calculate the third value of the third field based on the another rule. Further, the processing device may store the third value in the third field.

Operations 1905-1935 may repeat as the processing device traverses through the domain. The processing device may determine circular dependencies of items in the data model and may continuously or constantly determine updated values for the items that depend on each other. The processing device may identify patterns of dependencies between items and determine which order of items to update and/or a priority of items to update.

Figure 20:
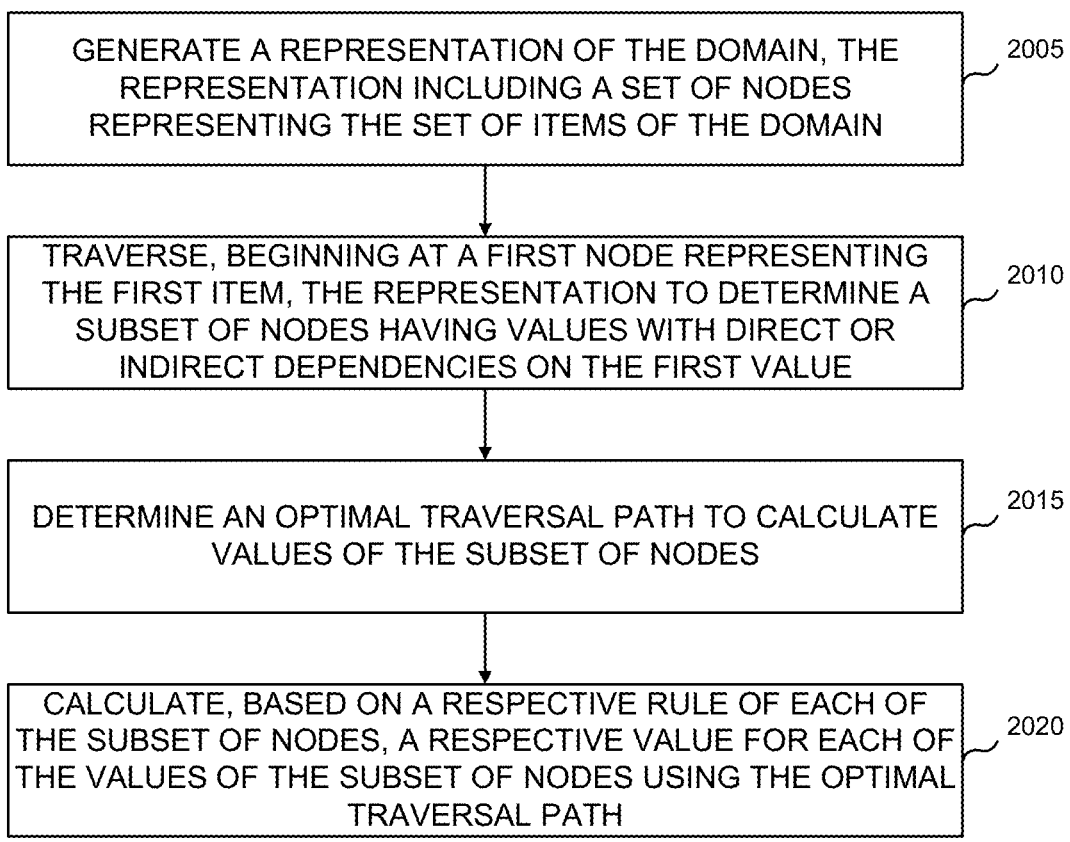
FIG. 20 illustrates operations of a calculation engine in one embodiment of a method for performing calculations using an optimal traversal path according to various embodiments of this disclosure.

FIG. 20 illustrates operations of a calculation engine in one embodiment of a method 2000 for performing calculations using an optimal traversal path according to various embodiments of this disclosure. One or more operations of the method 2000 may be performed by one or more processing devices executing the calculation engine 417 and/or the query engine 415. In some embodiments, one or more of the operations of the method 2000 may be performed as one or more sub-operations of the operation 1915 of the method 1900 of FIG. 19.

According to the non-limiting example of FIG. 20, method 2000 includes operation 2005, wherein a processing device may generate a representation of the domain of items obtained by performing the query definition described above with reference to the method 1900 of FIG. 19. The representation may include a set of nodes representing the set of items of the domain. In some embodiments, the representation may be a tree structure, a linked list, or any suitable structure capable of representing the relationships and/or dependencies between the items of the domain.

At operation 2010, the processing device may traverse, beginning at a first node representing the first item (which includes the first value that was requested to be modified in method 1900 in FIG. 19), the representation to determine a subset of nodes having values with direct or indirect dependencies on the first value. The second item may be represented as a second node included in the subset of nodes. The subset of nodes may be referred to as a sub-domain. While traversing the representation, the processing device may store an indication (e.g., hash value determined by performing a hash function on the item represented by a node) for each node of the set of nodes when the node is traversed the first time. In some embodiments, the processing device may throw, based on the indication, an error if the node is encountered again during traversal. In some embodiments, a rule may specify allowing traversal to continue by skipping the node whose indication is reencountered during traversal to proceed to a node that has not been encountered yet.

At operation 2015, the processing device may determine an optimal traversal path to calculate values of the subset of nodes. The optimal traversal path may include an order to update the values of the subset of nodes. At operation 2020, the processing device may calculate, based on a respective rule of each of the subset of nodes, a respective value for each of the values of the subset of nodes using the optimal traversal path during a second traversal of the subset of nodes.

In some embodiments, an optimal traversal path may not be determined. Instead, a single traversal of the subset of nodes may be performed and the values may be calculated for the items represented by the nodes as the nodes are encountered.

In some embodiments, the processing device may synchronize the representation of the subset of nodes when dependencies between items change in the representation of the subset of nodes or new items with new dependencies are added to the representation of the subset of nodes. The processing device may store the representation of the subset of nodes in memory to be quickly referenced when a subsequent request is received to modify a value of a field of an item in the representation of the subset of nodes. In some embodiments, the representation of the subset of nodes may be generated each time a request is received to modify a value of a field of an item represented by the subset of nodes.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for managing dependencies within a self-describing data system, the method comprising, by a computing device:
   accessing a plurality of items included in the self-describing data system, wherein each item of the plurality of items includes a respective value;
   receiving a request to modify the respective value of a particular item included in the plurality of items;
   generating a domain representation of the plurality of items, wherein the domain representation comprises, for each item of the plurality of items, a respective node that corresponds to the item;
   traversing, beginning at the respective node that corresponds to the particular item, the domain representation to identify a subset of nodes, wherein, for each node in the subset of nodes, the node directly or indirectly depends on at least the node that corresponds to the particular item;
   storing the subset of nodes in at least one memory to be referenced when subsequent requests are received to modify the respective values that correspond to the subset of nodes;
   identifying that (i) at least one dependency between at least two nodes of the subset of nodes has been modified, and/or (ii) at least one item has been added to the plurality of items and depends on at least one of the items that corresponds to the subset of nodes; and
   updating the domain representation to reflect the (i) the modification, and/or (ii) the addition.

2. The method of claim 1, further comprising:
   determining an optimal traversal path to calculate values for the subset of nodes, wherein the optimal traversal path comprises an order in which the values should be updated; and
   calculating, based on respective rules of the subset of nodes and the optimal traversal path, respective new values for the subset of nodes; and
   storing the respective new values into the subset of nodes.

3. The method of claim 1, further comprising, in conjunction with traversing the domain representation:
   storing a respective indication for each node of the domain representation when the node is traversed for a first time; and
   throwing, based on the respective indication, an error if the node is encountered again during subsequent traversals.

4. The method of claim 1, further comprising:
   updating the domain representation in conjunction with at least one request received to modify respective values of the nodes in the domain representation.

5. The method of claim 1, wherein the respective values of the plurality of items correspond to respective fields of the plurality of items.

6. The method of claim 1, wherein modifying a respective value of a first node of the subset of nodes comprises modifying respective values of at least one second node of the subset of nodes.

7. The method of claim 6, wherein modifying the respective values comprises performing Boolean operations, date calculation operations, summation operations, conversion operations, or some combination thereof.

8. The method of claim 6, further comprising:
   providing at least one notification of the modifications to the respective values of the at least one second node.

9. At least one tangible, non-transitory computer-readable medium storing instructions that, when executed by at least one processing device included in a computing device, cause the computing device to manage dependencies within a self-describing data system, by carrying out steps that include:
   accessing a plurality of items included in the self-describing data system, wherein each item of the plurality of items includes a respective value;
   receiving a request to modify the respective value of a particular item included in the plurality of items;
   generating a domain representation of the plurality of items, wherein the domain representation comprises, for each item of the plurality of items, a respective node that corresponds to the item;
   traversing, beginning at the respective node that corresponds to the particular item, the domain representation to identify a subset of nodes, wherein, for each node in the subset of nodes, the node directly or indirectly depends on at least the node that corresponds to the particular item;
   storing the subset of nodes in at least one memory to be referenced when subsequent requests are received to modify the respective values that correspond to the subset of nodes;
   identifying that (i) at least one dependency between at least two nodes of the subset of nodes has been modified, and/or (ii) at least one item has been added to the plurality of items and depends on at least one of the items that corresponds to the subset of nodes; and
   updating the domain representation to reflect the (i) the modification, and/or (ii) the addition.

10. The at least one computer-readable medium of claim 9, wherein the steps further include:
  determining an optimal traversal path to calculate values for the subset of nodes, wherein the optimal traversal path comprises an order in which the values should be updated; and
  calculating, based on respective rules of the subset of nodes and the optimal traversal path, respective new values for the subset of nodes; and
  storing the respective new values into the subset of nodes.

11. The at least one computer-readable medium of claim 9, wherein the steps further include, in conjunction with traversing the domain representation:
  storing a respective indication for each node of the domain representation when the node is traversed for a first time; and
  throwing, based on the respective indication, an error if the node is encountered again during subsequent traversals.

12. The at least one computer-readable medium of claim 9, wherein the steps further include:
  updating the domain representation in conjunction with at least one request received to modify respective values of the nodes in the domain representation.

13. The at least one computer-readable medium of claim 9, wherein the respective values of the plurality of items correspond to respective fields of the plurality of items.

14. The at least one computer-readable medium of claim 9, wherein modifying a respective value of a first node of the subset of nodes comprises modifying respective values of at least one second node of the subset of nodes.

15. The at least one computer-readable medium of claim 14, wherein modifying the respective values comprises performing Boolean operations, date calculation operations, summation operations, conversion operations, or some combination thereof.

16. The at least one computer-readable medium of claim 14, wherein the steps further include:
  providing at least one notification of the modifications to the respective values of the at least one second node.

17. A computing device configured to manage dependencies within a self-describing data system, the computing device comprising:
  at least one processor; and
  at least one memory storing instructions that, when executed by the at least one processor, cause the computing device to carry out steps that include:
    accessing a plurality of items included in the self-describing data system, wherein each item of the plurality of items includes a respective value;
    receiving a request to modify the respective value of a particular item included in the plurality of items;
    generating a domain representation of the plurality of items, wherein the domain representation comprises, for each item of the plurality of items, a respective node that corresponds to the item;
    traversing, beginning at the respective node that corresponds to the particular item, the domain representation to identify a subset of nodes, wherein, for each node in the subset of nodes, the node directly or indirectly depends on at least the node that corresponds to the particular item;
    storing the subset of nodes in at least one memory to be referenced when subsequent requests are received to modify the respective values that correspond to the subset of nodes;
    identifying that (i) at least one dependency between at least two nodes of the subset of nodes has been modified, and/or (ii) at least one item has been added to the plurality of items and depends on at least one of the items that corresponds to the subset of nodes; and
    updating the domain representation to reflect the (i) the modification, and/or (ii) the addition.

18. The computing device of claim 17, wherein the steps further include:
  determining an optimal traversal path to calculate values for the subset of nodes, wherein the optimal traversal path comprises an order in which the values should be updated; and
  calculating, based on respective rules of the subset of nodes and the optimal traversal path, respective new values for the subset of nodes; and
  storing the respective new values into the subset of nodes.

19. The computing device of claim 17, wherein the steps further include, in conjunction with traversing the domain representation:
  storing a respective indication for each node of the domain representation when the node is traversed for a first time; and
  throwing, based on the respective indication, an error if the node is encountered again during subsequent traversals.

20. The computing device of claim 17, wherein the steps further include:
  updating the domain representation in conjunction with at least one request received to modify respective values of the nodes in the domain representation.

* * * * *